| (12) | United States Patent | (10) Patent No.: | US 11,733,708 B2 |
|---|---|---|---|
| | Kawanai et al. | (45) Date of Patent: | Aug. 22, 2023 |

(54) AUTONOMOUS DRIVING SYSTEM

(71) Applicant: TOYOTA JIDOSHA KABUSHIKI KAISHA, Toyota (JP)

(72) Inventors: Taichi Kawanai, Susono (JP); Kazuhiko Kamikado, Susono (JP); Hideyuki Matsui, Shizuoka (JP); Hayato Ito, Susono (JP); Nobuhide Kamata, Susono (JP); Tomoyuki Kuriyama, Hadano (JP); Yasuhiro Kobatake, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 67 days.

(21) Appl. No.: 16/944,307

(22) Filed: Jul. 31, 2020

(65) Prior Publication Data

US 2021/0055741 A1    Feb. 25, 2021

(30) Foreign Application Priority Data

Aug. 23, 2019   (JP) .................................. 2019-152795

(51) Int. Cl.
  *G05D 1/02*  (2020.01)
  *G08G 1/16*  (2006.01)
  *G05D 1/00*  (2006.01)

(52) U.S. Cl.
  CPC ......... *G05D 1/0282* (2013.01); *G05D 1/0038* (2013.01); *G05D 1/0044* (2013.01); *G05D 1/0061* (2013.01); *G05D 1/0246* (2013.01); *G08G 1/167* (2013.01)

(58) Field of Classification Search
  None
  See application file for complete search history.

(56) References Cited

U.S. PATENT DOCUMENTS

2019/0011910 A1 *  1/2019  Lockwood ............. G08G 1/164
2020/0331491 A1 * 10/2020  Wray .............. B60W 30/18154

FOREIGN PATENT DOCUMENTS

| CN | 110869866 A | * | 3/2020 | .......... G05D 1/0214 |
| CN | 112349170 A | * | 2/2021 | ............. G09B 9/052 |
| JP | 3218865 B2 | * | 10/2001 | |
| JP | 2012104029 A | * | 5/2012 | |

(Continued)

*Primary Examiner* — Hunter B Lonsberry
*Assistant Examiner* — Paysun Wu
(74) *Attorney, Agent, or Firm* — Dickinson Wright, PLLC

(57) ABSTRACT

An autonomous driving system that performs a traveling of an autonomous driving vehicle based on a remote instruction by a remote commander includes: a vehicle position acquisition unit configured to acquire a position of the autonomous driving vehicle on the map; an external environment recognition unit configured to recognize an external environment of the autonomous driving vehicle; a remote instruction location situation recognition unit configured to recognize a remote instruction location situation on a target route of the autonomous driving vehicle set in advance based on the target route, the position of the autonomous driving vehicle on the map, and map information; and a remote instruction request determination unit configured to determine whether or not to request the remote commander for the remote instruction with regard to the remote instruction location situation, based on the external environment of the autonomous driving vehicle.

4 Claims, 8 Drawing Sheets

(56) References Cited

FOREIGN PATENT DOCUMENTS

| | | | | |
|---|---|---|---|---|
| JP | 2017068589 A | * | 4/2017 | ............ B60R 21/00 |
| JP | 2018077649 A | | 5/2018 | |
| WO | 2018106763 A1 | | 6/2018 | |

\* cited by examiner

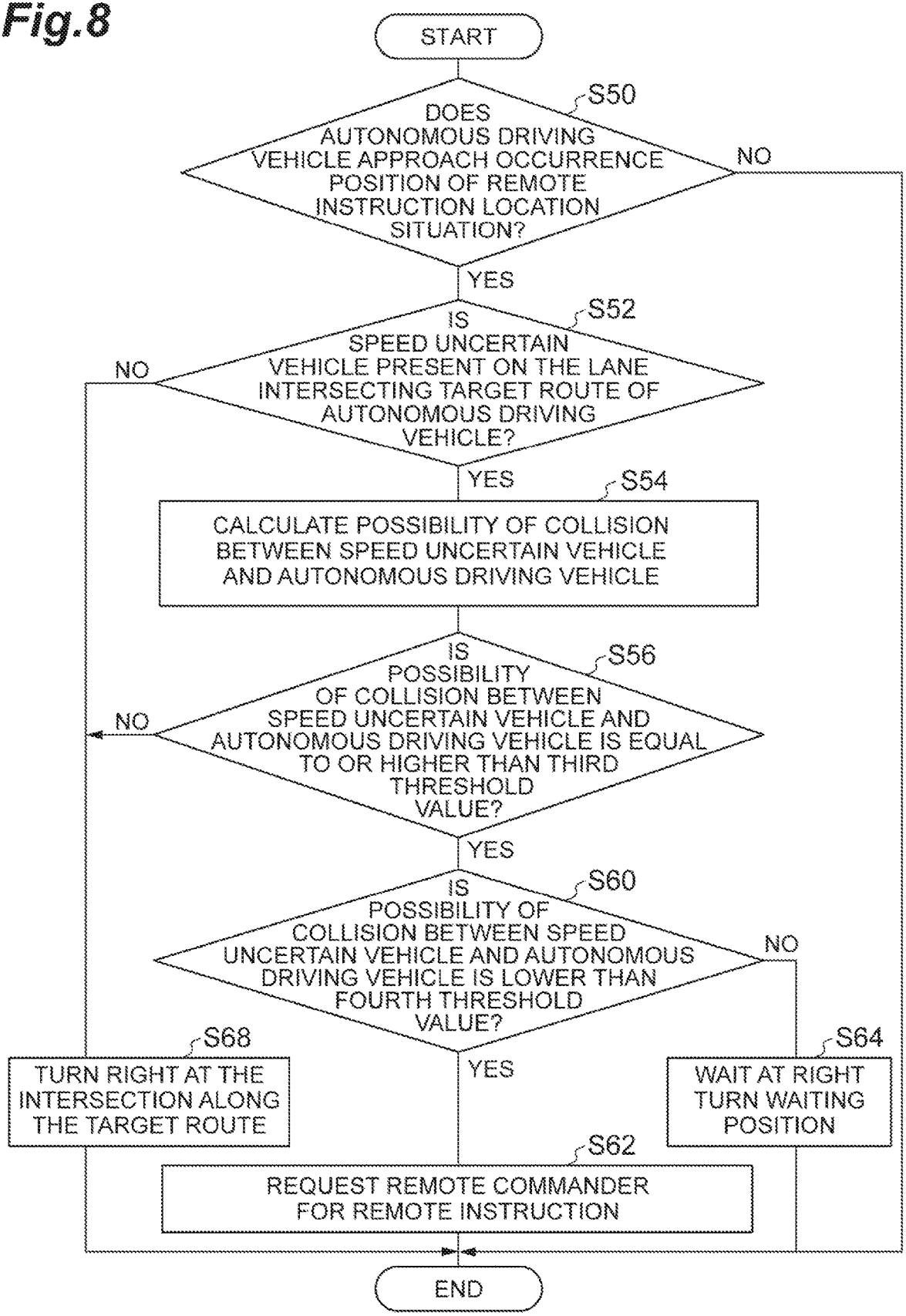

AUTONOMOUS DRIVING SYSTEM

TECHNICAL FIELD

The present disclosure relates to an autonomous driving system.

CROSS-REFERENCE TO RELATED APPLICATION

This application claims the benefit of priority from Japanese Patent Application No. 2019-152795, filed Aug. 23, 2019, the entire content of which are incorporated herein by reference.

BACKGROUND

In the related art, Japanese Patent Application No. 2018-77649 is known as a technical literature relating to an autonomous driving system. In this publication, a vehicle control system in which a remote operation of a vehicle is performed by a remote commander according to a remote control request transmitted from the vehicle performing the autonomous driving. In this vehicle control system, a steering amount of a steering wheel by the remote commander is transmitted to the vehicle, and a steering system of the vehicle is steered according to the steering amount by the remote commander, and then, the remote operation of the vehicle is performed.

SUMMARY

Incidentally, an autonomous driving system is considered, in which a remote commander issues a remote instruction such as progressing or stopping according to a situation of the autonomous driving vehicle such as a situation of turning right at an intersection, and the autonomous driving vehicle autonomously travels according to the remote instruction. However, in such an autonomous driving system, for example, every time the vehicle turns right at the intersection, if the remote instruction request is sent from the autonomous driving vehicle and the remote instruction by the remote commander is waited for, efficiency of the traveling of the autonomous driving vehicle may be deteriorated.

According to an aspect of the present disclosure, an autonomous driving system is a system that performs a traveling of an autonomous driving vehicle based on a remote instruction by a remote commander. The system includes: a vehicle position acquisition unit configured to acquire a position of the autonomous driving vehicle on a map; an external environment recognition unit configured to recognize an external environment of the autonomous driving vehicle; a remote instruction location situation recognition unit configured to recognize a remote instruction location situation on a target route of the autonomous driving vehicle set in advance based on the target route, the position of the autonomous driving vehicle on the map, and map information; and a remote instruction request determination unit configured to determine whether or not to request the remote commander for the remote instruction with regard to the remote instruction location situation, based on the external environment of the autonomous driving vehicle.

According to the autonomous driving system in one aspect of the present disclosure, the remote instruction location situation on the target route of the autonomous driving vehicle is recognized and whether or not to request the remote commander for the remote instruction with regard to the remote instruction location situation is determined based on the external environment of the autonomous driving vehicle, therefore, it is possible to suppress the decrease of the travel efficiency of the autonomous driving vehicle caused by the frequent remote instruction requests compared to a case of always requesting for the remote instruction by sending the request for the remote instruction in the remote instruction location situation.

The autonomous driving system according to one aspect of the present disclosure may further include: a blind area determination unit configured to determine whether or not a sensor blind area is present on a lane intersecting the target route of the autonomous driving vehicle in the remote instruction location situation, based on the target route of the autonomous driving vehicle and the external environment of the autonomous driving vehicle; and a first collision possibility calculation unit configured to calculate a possibility of collision between a virtual object having a speed set in advance and the autonomous driving vehicle under an assumption that the virtual object jumps out from the sensor blind area when the autonomous driving vehicle continues to travel on the target route by the autonomous driving, if it is determined by the blind area determination unit that the sensor blind area is present. The remote instruction request determination unit may be configured to determine that the remote instruction is not requested if the possibility of collision is lower than a first threshold value and/or if the possibility of collision is equal to or higher than a second threshold value which is larger than the first threshold value. In the autonomous driving system, if the sensor blind area is present on the lane intersecting the target route of the autonomous driving vehicle in the remote instruction location situation, the possibility of collision between the virtual object that is assumed to jump out from the sensor blind area at a speed set in advance and the autonomous driving vehicle is calculated, and if the possibility of collision is lower than the first threshold value or equal to or higher than the second threshold value that is larger than the first threshold value, it is determined that the remote instruction is not requested. Therefore, according to the autonomous driving system, since the remote instruction is not requested to the remote commander when there is little need to be confused in the determination of the autonomous driving vehicle even if the virtual object is taken into consideration, it is possible to suppress the decrease of the travel efficiency of the autonomous driving vehicle caused by the frequent remote instruction requests.

The autonomous driving system described above may further include: an autonomous driving control unit configured to cause the autonomous driving vehicle to continue to travel along the target route if the possibility of collision between the virtual object and the autonomous driving vehicle is lower than the first threshold value and it is determined that the remote instruction is not requested, or to cause the autonomous driving vehicle to stop if the possibility of collision between the virtual object and the autonomous driving vehicle is equal to or higher than the second threshold value and it is determined that the remote instruction is not requested. According to the autonomous driving system, the autonomous driving vehicle continues to travel along the target route by the autonomous driving if it is determined that the remote instruction is not requested because the low possibility of collision between the virtual object and the autonomous driving vehicle is low, or the autonomous driving vehicle is stopped if it is determined that the remote instruction is not requested because the possibility of collision between the virtual object and the autonomous driving vehicle is high, therefore, it is possible to suppress the decrease of the travel efficiency of the autonomous driving vehicle.

In the autonomous driving system according to one aspect of the present disclosure, a speed uncertain vehicle determination unit configured to determine whether or not a speed uncertain vehicle is present, which is another vehicle having an uncertain speed on a lane intersecting the target route of the autonomous driving vehicle in the remote instruction location situation, based on the target route of the autonomous driving vehicle and the external environment of the autonomous driving vehicle; and a second collision possibility calculation unit configured to calculate a possibility of collision between the speed uncertain vehicle and the autonomous driving vehicle under an assumption that the speed uncertain vehicle is approaching at a speed set in advance when the autonomous driving vehicle continues to travel on the target route by the autonomous driving, if it is determined by the speed uncertain vehicle determination unit that the speed uncertain vehicle is present. The remote instruction request determination unit may be configured to determine that the remote instruction is not requested, if the possibility of collision is lower than a third threshold value and/or if the possibility of collision is equal to or higher than a fourth threshold value which is larger than the third threshold value. In this autonomous driving system, if the speed uncertain vehicle is present on the lane intersecting the target route of autonomous driving vehicle in the remote instruction location situation, the possibility of collision between the speed uncertain vehicle assumed to approach at a speed set in advance and the autonomous driving vehicle is calculated, and when the possibility of collision is lower than the third threshold value or equal to or higher than the fourth threshold value which is larger than the third threshold value, it is determined that the remote instruction is not requested. Therefore, according to the autonomous driving system, since the remote instruction is not requested to the remote commander when there is little need to be confused in the determination of the autonomous driving vehicle even if the speed uncertain vehicle is taken into consideration, it is possible to suppress the decrease of the travel efficiency of the autonomous driving vehicle caused by the frequent remote instruction requests.

The autonomous driving system described above may further include: an autonomous driving control unit configured to cause the autonomous driving vehicle to continue to travel along the target route if the possibility of collision between the speed uncertain vehicle and the autonomous driving vehicle is lower than the third threshold value and if it is determined that the remote instruction is not requested, or to cause the autonomous driving vehicle to stop if the possibility of collision between the speed uncertain vehicle and the autonomous driving vehicle is equal to or higher than the fourth threshold value and it is determined that the remote instruction is not requested. In the autonomous driving system, the autonomous driving vehicle continues to travel along the target route by the autonomous driving if it is determined that the remote instruction is not requested because the possibility of collision between speed uncertain vehicle and the autonomous driving vehicle is low, or the autonomous driving vehicle is stopped if it is determined that the remote instruction is not requested because the possibility of collision between the speed uncertain vehicle and the autonomous driving vehicle is high. Therefore, it is possible to suppress the decrease in the travel efficiency of the autonomous driving vehicle.

According to the autonomous driving system in one aspect of the present disclosure, it is possible to suppress the decrease in the travel efficiency of the autonomous driving vehicle due to the request for the remote instruction.

BRIEF DESCRIPTION OF THE DRAWINGS

FIG. 8 is a flowchart illustrating a specific example of the remote instruction request determination processing when a remote instruction location situation is a situation of turning right at an intersection in the second embodiment.

DETAILED DESCRIPTION

Embodiments of the present disclosure will be described below with reference to the drawings.

Figure 1:
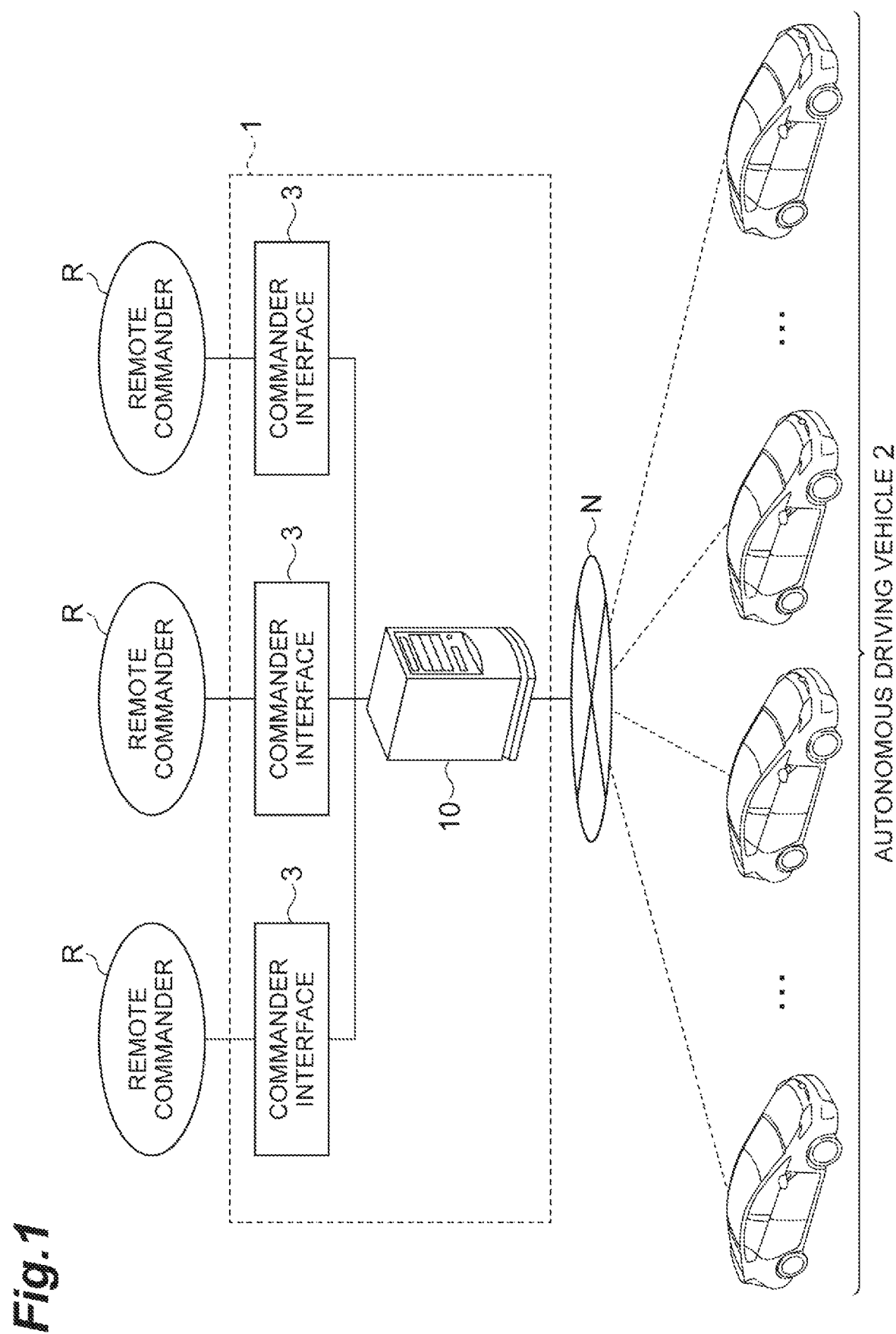
FIG. 1 is a schematic diagram illustrating an example of a vehicle remote instruction system.

FIG. 1 is a diagram illustrating an overview of a vehicle remote instruction system RS according to an embodiment. A vehicle remote instruction system RS illustrated in FIG. 1 is a system that performs a remote instruction to autonomous driving vehicles 2 by remote commanders R. The remote instruction is an instruction from the remote commander R regarding the traveling of the autonomous driving vehicle 2.

The remote instruction includes an instruction to the autonomous driving vehicle 2 to progress and an instruction to the autonomous driving vehicle 2 to stop. The remote instruction may include an instruction to autonomous driving vehicle 2 to change a lane. In addition, the remote instruction may include an instruction to perform an offset avoidance for an obstacle ahead, an instruction to overtake a preceding vehicle, an instruction to perform an emergency evacuation, or the like. In addition, the remote instruction may include an instruction (for example, an instruction to automatically open and close doors, an instruction to start voice guidance for getting off) to the autonomous driving vehicle 2 for getting on and off of occupants.

As illustrated in FIG. 1, a vehicle remote instruction system RS includes a remote instruction apparatus 1 in which a remote commander R inputs a remote instruction. The remote instruction apparatus 1 is communicably connected to a plurality of autonomous driving vehicles 2 via a network N. The network N is a wireless communication network. Various information is sent to the remote instruction apparatus 1 from the autonomous driving vehicles 2.

In the vehicle remote instruction system RS, for example, the remote commander R is requested to input a remote instruction in response to a remote instruction request from an autonomous driving vehicle 2. The remote commander R inputs the remote instruction to an commander interface 3 of the remote instruction apparatus 1. The remote instruction apparatus 1 transmits the remote instruction to the autonomous driving vehicle 2 through the network N. The autonomous driving vehicle 2 autonomously travels according to the remote instruction. An autonomous driving system RS is mounted on the autonomous driving vehicle 2.

In the vehicle remote instruction system RS, the number of remote commanders R is not limited, and may be one or may be equal to or more than 2. The number of autonomous driving vehicles 2 that can communicate with the vehicle remote instruction system RS is also not particularly limited. A plurality of remote commanders R may alternately perform the remote instruction for one autonomous driving vehicle 2 or one remote commander R may perform the remote instruction for two or more autonomous driving vehicles 2.

First Embodiment

Configuration of Autonomous Driving System

Figure 2:
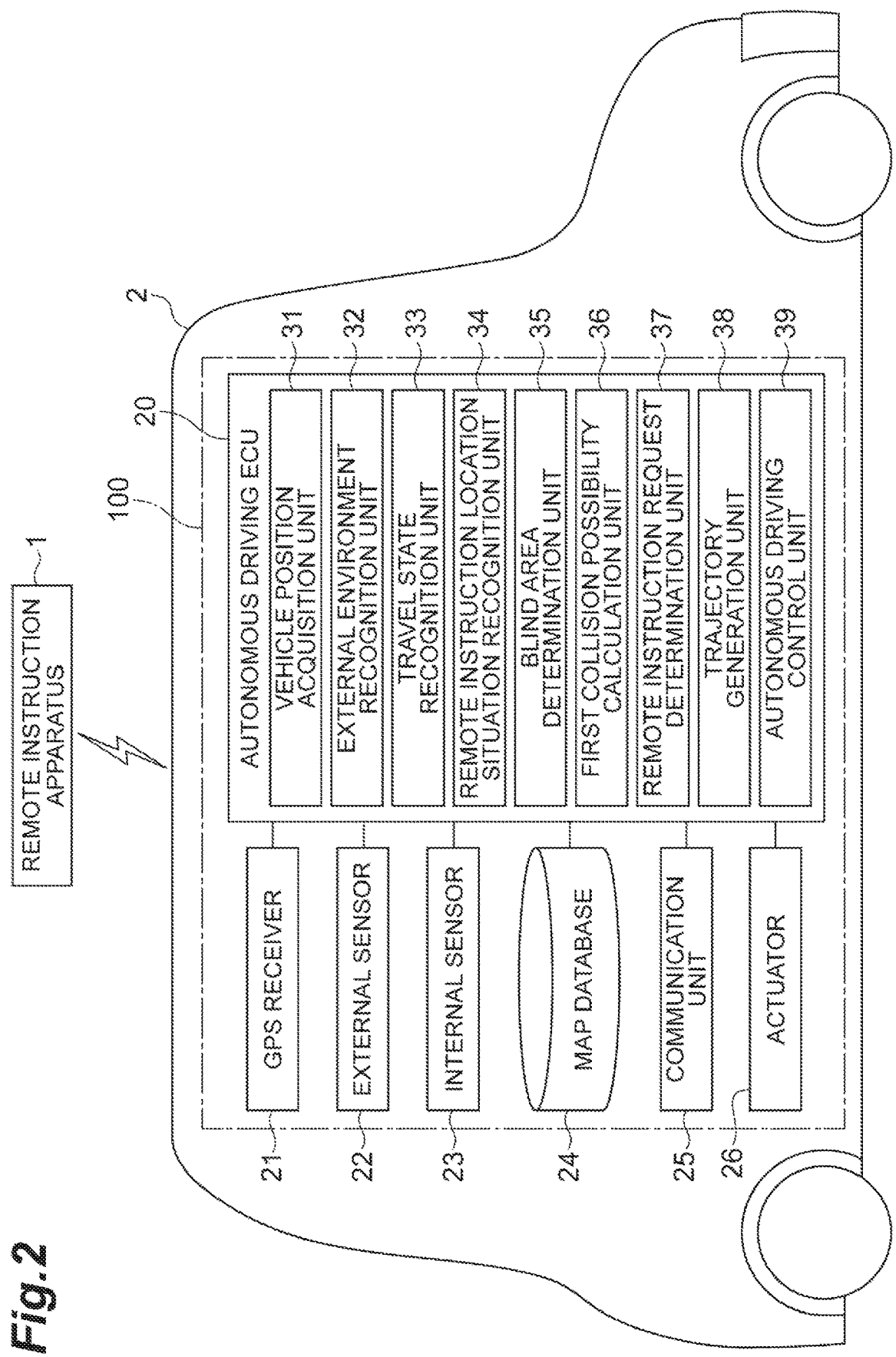
FIG. 2 is a block diagram illustrating an example of an autonomous driving system according to a first embodiment.

First, an example of the configuration of the autonomous driving system according to the first embodiment will be described below. FIG. 2 is a block diagram showing an example of an autonomous driving system. As shown in FIG. 2, the autonomous driving system 100 is mounted on an autonomous driving vehicle 2 and includes an autonomous driving ECU 20. The autonomous driving ECU 20 is an electronic control unit having a CPU, ROM, RAM, and the like. In the autonomous driving ECU 20, for example, various functions are realized by loading a program recorded in the ROM into the RAM and executing the program loaded in the RAM by the CPU. The autonomous driving ECU 20 may be configured with a plurality of electronic units.

The autonomous driving ECU 20 is connected to a global positioning system (GPS) receiver 21, an external sensor 22, an internal sensor 23, a map database 24, a communication unit 25, and an actuator 26.

The GPS receiver 21 measures a position of the autonomous driving vehicle 2 (for example, latitude and longitude of the autonomous driving vehicle 2) by receiving signals from equal to or more than three GPS satellites. The GPS receiver 21 transmits information on the measured position of the autonomous driving vehicle 2 to the autonomous driving ECU 20.

The external sensor 22 is a vehicle-mounted sensor that detects an external environment of the autonomous driving vehicle 2. The external sensor 22 includes at least a camera. The camera is an imaging device that images the external environment of the autonomous driving vehicle 2. The camera is provided on the inside of a windshield of the autonomous driving vehicle 2 and images the front of the vehicle. The camera transmits imaging information relating to the external environment of the autonomous driving vehicle 2 to the autonomous driving ECU 20. The camera may be a monocular camera or may be a stereo camera. A plurality of cameras may be provided, and may image the left and right sides and the rear side, in addition to the front of the autonomous driving vehicle 2.

The autonomous driving vehicle 2 may include an external camera toward the remote commander. The external camera toward the remote commander images at least the front of the autonomous driving vehicle 2. The external camera toward the remote commander may be configured with a plurality of cameras that image the surroundings including the side and rear of the autonomous driving vehicle 2.

The external sensor 22 may include a radar sensor. The radar sensor is a detection device that detects an object around the autonomous driving vehicle 2 using radio waves (for example, millimeter waves) or light. The radar sensor includes, for example, millimeter wave radar or a light detection and ranging (LIDAR). The radar sensor transmits the radio wave or light to the surroundings of the autonomous driving vehicle 2, and detects the objects by receiving the radio waves or the light reflected from the objects. The radar sensor transmits the detected object information to the autonomous driving ECU 20. The objects include fixed objects such as guardrails and buildings, and moving objects such as pedestrians, bicycles, other vehicles, and the like. In addition, the external sensor 22 may include a sound detection sensor that detects a sound outside the autonomous driving vehicle 2.

The internal sensor 23 is a vehicle-mounted sensor that detects a travel state of the autonomous driving vehicle 2. The internal sensor 23 includes a vehicle speed sensor, an accelerator sensor, and a yaw rate sensor. The vehicle speed sensor is a measurement device that measures a speed of the autonomous driving vehicle 2. As a vehicle speed sensor, for example, a vehicle wheel speed sensor is used, which is provided on vehicle wheels of the autonomous driving vehicle 2 or on a drive shaft rotating integrally with vehicle wheels, and measures a rotational speed of the vehicle wheels. The vehicle speed sensor transmits the measured vehicle speed information (vehicle wheel speed information) to the autonomous driving ECU 20.

The accelerator sensor is a measurement device that measures an acceleration of the autonomous driving vehicle 2. The accelerator sensor includes, for example, a longitudinal accelerator sensor that measures acceleration in the longitudinal direction of the autonomous driving vehicle 2 and the accelerator sensor may include a lateral accelerator sensor that measures a lateral acceleration of the autonomous driving vehicle 2. The accelerator sensor transmits, for example, acceleration information of the autonomous driving vehicle 2 to the autonomous driving ECU 20. The yaw rate sensor is a measurement device that measures a yaw rate (rotation angular velocity) around the vertical axis at the center of gravity of the autonomous driving vehicle 2. As the yaw rate sensor, for example, a Gyro sensor can be used. The yaw rate sensor transmits the measured yaw rate information of the autonomous driving vehicle 2 to the autonomous driving ECU 20.

The map database 24 is a database that records map information. The map database 24 is formed, for example, in a recording device such as a hard disk drive (HDD) mounted on the autonomous driving vehicle 2. The map information includes information on the position of the road, information on the shape of the road (for example, curvature information) and information on the position of the intersection and the branch. The map information may include traffic regulation information such as a legal speed associated with the position information. The map information may include target object information used for acquiring the position information of the autonomous driving vehicle 2. As the target, road signs, road markings, traffic signals, utility poles, and the like can be used. The map database 24 may be configured as a server that can communicate with the autonomous driving vehicle 2. The server is not limited to the remote instruction server 10.

The communication unit 25 is a communication device that controls the wireless communication with the outside of the autonomous driving vehicle 2. The communication unit 25 transmits and receives various information with the remote instruction server 10 via the network N.

The vehicle actuator 26 is a device used for controlling the autonomous driving vehicle 2. The vehicle actuator 26 includes at least a drive actuator, a brake actuator and a steering actuator. The drive actuator controls a driving force of the autonomous driving vehicle 2 by controlling an amount of air (throttle opening degree) supplied to the engine according to a control signal from the autonomous driving ECU 20. If the autonomous driving vehicle 2 is a hybrid vehicle, in addition to the amount of air supplied to the engine, the control signal from the autonomous driving ECU 20 is input to a motor as a power source, and then, the driving force is controlled. If the autonomous driving vehicle 2 is an electric vehicle, the control signal from the autonomous driving ECU 20 is input to a motor as a power source, and then, the driving force of the vehicle V is controlled. The motor as the power source in these cases configures the vehicle actuator 26.

The brake actuator controls the brake system according to a control signal from the autonomous driving ECU 20 and controls a braking force applied to the vehicle wheels of the autonomous driving vehicle 2. For example, a hydraulic brake system can be used as the brake system. The steering actuator controls the driving of an assist motor controlling a steering torque of an electric power steering system according to a control signal from the autonomous driving ECU 20. In this way, the steering actuator controls the steering torque of the autonomous driving vehicle 2.

Next, an example of a functional configuration of the autonomous driving ECU 20 will be described. The autonomous driving ECU 20 includes a vehicle position acquisition unit 31, an external environment recognition unit 32, a travel state recognition unit 33, a remote instruction location situation recognition unit 34, a blind area determination unit 35, a first collision possibility calculation unit 36, a remote instruction request determination unit 37, a trajectory generation unit 38, and an autonomous driving control unit 39.

The vehicle position acquisition unit 31 acquires position information of the autonomous driving vehicle 2 based on the position information on the GPS receiver 21 and the map information on the map database 24. In addition, the vehicle position acquisition unit 31 may acquire the position information of the autonomous driving vehicle 2 using the target object information included in the map information on the map database 24 and the result of detection performed by the external sensor 22 using the simultaneous localization and mapping (SLAM) technology. The vehicle position acquisition unit 31 may recognize a lateral position of the autonomous driving vehicle 2 relative to a lane (the position of the autonomous driving vehicle 2 in the lane width direction) from a position relationship between lane marking lines and the autonomous driving vehicle 2, and then, may include the lateral position in the position information. The vehicle position acquisition unit 31 may acquire the position information of the autonomous driving vehicle 2 using another known method.

The external environment recognition unit 32 recognizes the external environment of the autonomous driving vehicle 2 based on the result of detection performed by the external sensor 22. The external environment includes a relative position of surrounding objects relative to the autonomous driving vehicle 2. The external environment may include the relative speed and moving direction of the surrounding objects relative to the autonomous driving vehicle 2. The external environment may include types of the objects such as other vehicles, pedestrians, and bicycles. The types of the object can be identified by a known method such as pattern matching. The external environment may include a result of recognition of the marking lines (lane line recognition) around the autonomous driving vehicle 2. The external environment may include a result of recognition of a lighting state of a traffic signal. The external environment recognition unit 32 can recognize the lighting state of the traffic signal (the lighting state in which the vehicle can pass or the lighting state in which the vehicle is not allowed to pass) in front of the autonomous driving vehicle 2 based on, for example, the image from the camera of the external sensor 22.

The travel state recognition unit 33 recognizes the travel state of the autonomous driving vehicle 2 based on the result of detection performed by the internal sensor 23. The travel state includes the vehicle speed of autonomous driving vehicle 2, the acceleration of autonomous driving vehicle 2, and the yaw rate of autonomous driving vehicle 2. Specifically, the travel state recognition unit 33 recognizes the vehicle speed of the autonomous driving vehicle 2 based on the vehicle speed information from the vehicle speed sensor. The travel state recognition unit 33 recognizes the acceleration of the autonomous driving vehicle 2 based on the vehicle speed information from the accelerator sensor. The travel state recognition unit 33 recognizes the orientation of the autonomous driving vehicle 2 based on the yaw rate information from the yaw rate sensor.

The remote instruction location situation recognition unit 34 recognizes a remote instruction location situation on a target route based on the target route of the autonomous driving vehicle set in advance, a position of the autonomous driving vehicle on the map, and map information.

The target route is a route that the autonomous driving vehicle 2 travels in the autonomous driving. The target route is set based on, for example, a destination, the map information, and position information on the autonomous driving vehicle 2. The target route may be set while taking traffic information such as a traffic congestion into consideration. The target route may be set by a well-known navigation system. The destination may be set by the occupant of the autonomous driving vehicle 2, or may be automatically proposed by the autonomous driving ECU 20 or the navigation system.

The remote instruction location situation includes at least one of a situation of turning right at an intersection, a situation of turning left from a T-shape road to a priority road, a situation of passing an intersection with or without a traffic signal, a situation of passing a traffic signal (for example, a situation of passing a traffic signal corresponding to a crosswalk on the road), or a situation of starting the lane change for example. The intersection includes a roundabout (a rotary). The remote instruction location situation may include a situation of entering a railroad crossing and the like.

In a case of a country or region of using the right-hand side for a vehicle, a situation of turning right at the intersection can be replaced by a situation of turning left at the intersection. The situation turning left from the T-shape road to the priority road can also be replaced by a situation of turning right from the T-shape road to the priority road.

The remote instruction location situation recognition unit 34 recognizes a remote instruction location situation that can be recognized from the map information and the target route. The remote instruction location situation recognition unit 34 recognizes the occurrence position of the remote instruction location situation together with the remote instruction location situation. The occurrence position of the remote instruction location situation is a position on the map associated with the remote instruction location situation.

The remote instruction location situation recognition unit 34 recognizes a situation of turning right at the intersection as a remote instruction location situation from an intersection scheduled to turn right on the target route of the autonomous driving vehicle 2. The occurrence position of the situation of turning right at the intersection is, for example, the position of the intersection. The remote instruction location situation recognition unit 34 recognizes, for example, a situation of passing through the intersection as the remote instruction location situation from the intersection on the target route of the autonomous driving vehicle 2. The occurrence position of the situation of passing through the intersection is, for example, the position of the intersection or the position of a temporary stop line before the intersection. The remote instruction location situation recognition unit 34 also recognizes the presence or absence of the traffic signal at the intersection from the map information.

The remote instruction location situation recognition unit 34 recognizes a situation of turning left from the T-shape road to the priority road as the remote instruction location situation, from the intersection of the T-shape road on the target route and the target route. The occurrence position in this case can be the same as that at the intersection. The remote instruction location situation recognition unit 34 recognizes a situation of entering the roundabout as a remote instruction location situation, from the roundabout on the target route. The occurrence position in this case can be the same as that at the intersection.

The remote instruction location situation recognition unit 34 recognizes a situation of passing through the traffic signal as a remote instruction location situation, from the traffic signal corresponding to the pedestrian crossing on the target route. The occurrence position of the situation of passing through the traffic signal is, for example, the position of the temporary stop line before the traffic signal. As the occurrence position of the situation of passing through the traffic signal, the position of the pedestrian crossing may be adopted, or the position of the traffic signal may be adopted.

The remote instruction location situation recognition unit 34 recognizes the situation of starting the lane change as the remote instruction location situation, from a section where the lane change is required on the target route and a section where the lane change is permitted by the traffic regulations on the map. The occurrence position of the situation of starting the lane change may be a start position of the section where the lane change is permitted, or may be a position advanced by a certain distance from the start position. The occurrence position of a situation of starting the lane change may be a position a certain distance before the end position of the section where the lane change is permitted.

Alternatively, the remote instruction location situation recognition unit 34 may recognize the remote instruction location situation based on the external environment of the autonomous driving vehicle 2. In this case, it is not necessary to recognize the occurrence position of the remote instruction location situation. For example, if an obstacle such as a parking vehicle protruding from the shoulder of the road is recognized, the remote instruction location situation recognition unit 34 recognizes a situation in which the autonomous driving vehicle performs the offset avoidance as a remote instruction location situation.

If a bicycle traveling on the side of the road is recognized, the remote instruction location situation recognition unit 34 may recognize the situation of overtaking the bicycle as the remote instruction location situation. If an object falling on the road is recognized, the remote instruction location situation recognition unit 34 may recognize a situation of avoiding the falling object as the remote instruction location situation.

In addition, the remote instruction location situation recognition unit 34 recognizes a situation in which an emergency vehicle such as an ambulance approaches, a situation in which the road surface is damaged such as a depression, or a situation in which an animal crosses a road, as the remote instruction location situation.

When the autonomous driving vehicle 2 approaches the occurrence position of the remote instruction location situation, the blind area determination unit 35 determines whether or not a sensor blind area is present on a lane intersecting the target route of the autonomous driving vehicle 2 in the remote instruction location situation, based on the target route of the autonomous driving vehicle 2 and the external environment of the autonomous driving vehicle 2. The remote instruction location situation may be limited to the situation of turning right at the intersection, may be limited to the situation of passing through the intersection without a traffic signal, or may be limited to the situation of turning left from the T-shape road to the priority road.

The case of approaching the occurrence position of the remote instruction location situation is, for example, a case where a distance between the autonomous driving vehicle 2 on the target route and the occurrence position of the remote instruction location situation is shorter than an approach determination threshold value. Alternatively, when the autonomous driving vehicle 2 approaches the occurrence position of the remote instruction location situation, the case of approaching the occurrence position of the remote instruction location situation may be a case where a remaining time for the autonomous driving vehicle 2 to reach the occurrence position of the remote instruction location situation is shorter than a time threshold value. The approach determination threshold value and the time threshold value are threshold values set in advance.

The sensor blind area is an area where the external sensor 22 of the autonomous driving vehicle 2 cannot perform the detection due to obstacles such as buildings or other vehicles. The sensor blind area does not include an area outside the detectable distance of the external sensor 22.

The blind area determination unit 35 recognizes a lane intersecting the target route of the autonomous driving vehicle 2, from the target route of the autonomous driving vehicle 2 and the external environment. The blind area determination unit 35 recognizes a sensor blind area in a lane intersecting the target route from the detection range of the external sensor 22, by recognizing, for example, the presence of the obstacles around the autonomous driving vehicle 2. The blind area determination unit 35 may treat the sensor blind area smaller than a size set in advance as there is no sensor blind area. The size set in advance is not particularly limited, but may be, for example, a size enough for a normal vehicle to enter. The blind area determination unit 35 may recognize the sensor blind area using another method.

An example of the remote instruction location situation in which there is a sensor blind area on the lane intersecting the target route, include at least one of the situation of turning right at the intersection, the situation of turning left from the T-shape road to the priority road, and a situation of entering the intersection and going straight.

Figure 3:
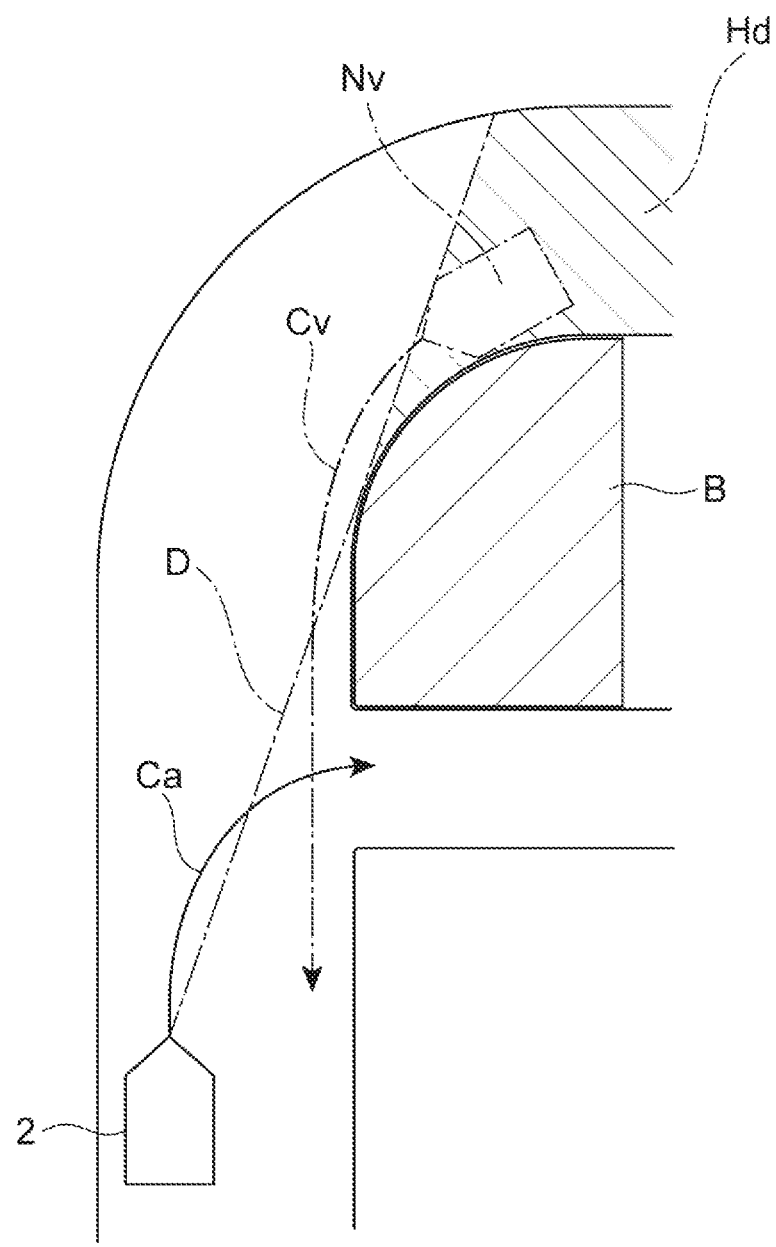
FIG. 3 is a plan view illustrating an example of a sensor blind area.

Here, FIG. 3 is a plan view illustrating an example of a sensor blind area. FIG. 3 illustrates a situation in which the autonomous driving vehicle 2 turns right at the intersection as the remote instruction location situation. In FIG. 3, the autonomous driving vehicle 2, a target route Ca of the autonomous driving vehicle 2, a building B, a boundary line D of a detection range of the external sensor 22 blocked by the building B, a sensor blind area Hd generated due to the building B, a virtual object Nv, a progressing route Cv for the virtual object Nv are illustrated. The virtual object Nv will be described later. In FIG. 3, the autonomous driving vehicle 2 is in a situation of turning right at an intersection. In the situation in FIG. 3, the blind area determination unit 35 determines that the sensor blind area Hd blocked by the building B is present on the lane intersecting the target route Ca of the autonomous driving vehicle 2.

If it is determined by the blind area determination unit 35 that the sensor blind area is present, the first collision possibility calculation unit 36 calculates a possibility of collision between a virtual object and the autonomous driving vehicle 2 under an assumption that the virtual object jumps out from the sensor blind area at a speed set in advance when the autonomous driving vehicle 2 continues to travel on the target route by autonomous driving.

The virtual object is an object that is assumed to jump out from the sensor blind area at a speed set in advance. The virtual object is, for example, another vehicle. The virtual object is not limited to a four-wheeled vehicle, but may be a two-wheeled vehicle or a bicycle. The speed set in advance is not particularly limited. The speed set in advance may be a fixed value or a legal maximum speed corresponding to the lane. The speed set in advance may be a reference speed (for example, an average speed) of the traffic flow in the lane. The reference speed of the traffic flow can be obtained, for example, by communication with a traffic information center. The first collision possibility calculation unit 36 may select a speed at which the possibility of collision becomes highest among a plurality of speeds set in advance that are equal to or lower than the legal maximum speed.

In the situation illustrated in FIG. 3, the first collision possibility calculation unit 36 assumes that the virtual object Nv is present in the sensor blind area Hd and that the virtual object Nv is approaching along the progressing route Cv intersecting the target route Ca of the autonomous driving vehicle 2 at a speed set in advance. The first collision possibility calculation unit 36 calculates the possibility of collision between the autonomous driving vehicle 2 and the virtual object Nv when the autonomous driving vehicle 2 turns right along the target route Ca.

As the possibility of collision between the autonomous driving vehicle 2 and the virtual object Nv, the first collision possibility calculation unit 36 may use a value that increases as a minimum value of the predicted time to collision (TTC) decreases. A time-head way (THW) may be used instead of the time to collision. In addition, the first collision possibility calculation unit 36 may use a value that increases as a minimum approach distance between the autonomous driving vehicle 2 and the virtual object Nv decreases. Various well-known calculation methods can be used to calculate the possibility of collision.

When the autonomous driving vehicle 2 approaches the occurrence position of the remote instruction location situation, the remote instruction request determination unit 37 determines whether a remote instruction request unnecessity condition set in advance is satisfied or not based on the external environment of the autonomous driving vehicle 2.

The remote instruction request unnecessity condition is a condition for determining that a remote instruction request to the remote commander R is unnecessary in a remote instruction location situation. The remote instruction request unnecessity condition may be set different from each other depending on the remote instruction location situations.

For example, if the remote instruction location situation is a situation of turning right at the intersection, the remote instruction request determination unit 37 determines that the remote instruction request unnecessity condition is satisfied when another vehicle is present on the lane intersecting the target route of the autonomous driving vehicle 2.

If the remote instruction location situation is a situation of turning right at the intersection, when it is determined that other vehicle is not present on the lane intersecting the target route of autonomous driving vehicle 2 and it is determined by the blind area determination unit 35 that the sensor blind area is not present, the remote instruction request determination unit 37 determines that the remote instruction request unnecessity condition is satisfied assuming that it is possible to turn right by the autonomous driving without requesting the remote commander R for the remote instruction.

In addition, when it is determined that other vehicle is not present on the lane intersecting the target route of autonomous driving vehicle 2 and it is determined by the blind area determination unit 35 that the sensor blind area is present, but when the possibility of collision between the virtual object and the autonomous driving vehicle 2 calculated by the first collision possibility calculation unit 36 is lower than a first threshold value, the remote instruction request determination unit 37 determines that the remote instruction request unnecessity condition is satisfied assuming that it is possible to turn right by the autonomous driving without requesting the remote commander R for the remote instruction. The first threshold value is a threshold value having a value set in advance.

If it is determined that other vehicle is not present on the lane intersecting the target route of autonomous driving vehicle 2 and it is determined by the blind area determination unit 35 that the sensor blind area is present, and when the possibility of collision between the virtual object and the autonomous driving vehicle 2 is equal to or higher than a second threshold value, even if the remote instruction is requested to the remote commander R, since it is highly probable that the autonomous driving vehicle 2 will wait and a possibility of any situation change is not expected, the remote instruction request determination unit 37 determines that the remote instruction request unnecessity condition is satisfied. The second threshold value is a threshold value set in advance, and having a value larger than that of the first threshold value.

On the other hand, for example, if the possibility of collision between the virtual object and the autonomous driving vehicle 2 is equal to or higher than the first threshold value and lower than the second threshold value, the remote instruction request determination unit 37 determines that the remote instruction request unnecessity condition is not satisfied.

The remote instruction request determination unit 37 may determine that the remote instruction request unnecessity condition is satisfied if the possibility of collision is lower than the first threshold value, and that the remote instruction request unnecessity condition is not satisfied if the possibility of collision is equal to or higher than the second threshold value. Conversely, the remote instruction request determination unit 37 may determine that the remote instruction request unnecessity condition is not satisfied if the possibility of collision is lower than the first threshold value, and that the remote instruction request unnecessity condition is satisfied if the possibility of collision is equal to or higher than the second threshold value. In addition, if the remote instruction location situation is a situation of passing through an intersection without a traffic signal, the remote instruction request determination unit 37 may determine the remote instruction request unnecessity condition using the sensor blind area and the possibility of collision with the virtual object, in the same manner as in the situation of turning right at the intersection.

If the remote instruction location situation is a situation of starting the lane change, when there is no enough space for the autonomous driving vehicle 2 to enter between vehicle 2 and another vehicle in the adjacent lane which is a destination of the lane change, the remote instruction request determination unit 37 may determine that the remote instruction request unnecessity condition is satisfied because there is no other choice. When a distance sufficient for performing the lane change cannot be secured up to the end position of the section where the lane change is permitted, the remote instruction request determination unit 37 may determine that the remote instruction request unnecessity condition is satisfied.

When another vehicle approaching from behind is recognized in the adjacent lane, and the possibility of collision between the autonomous driving vehicle 2 that is changing lane and the other vehicle is equal to or higher than a determination threshold value, the remote instruction request determination unit 37 may determine that the remote instruction request unnecessity condition is satisfied. The determination threshold value is a threshold value having a value set in advance. If the remote instruction location situation recognition unit 34 recognizes the situation of starting the lane change without considering the section where the lane change is permitted by the traffic regulations, when the position of autonomous driving vehicle 2 is not in the section where the lane change is permitted by the traffic regulations, the remote instruction request determination unit 37 may determine that the remote instruction request unnecessity condition is satisfied because there are no other choices.

When there is no other vehicle in the adjacent lane which is the destination of the lane change and when it is possible to secure enough distance to perform the lane change up to the end position of the section where the lane change is permitted, the remote instruction request determination unit 37 may determine that the remote instruction request unnecessity condition is satisfied assuming that it is possible to perform the lane change by the autonomous driving without obtaining the determination by the remote commander R.

On the other hand, if the remote instruction location situation is a situation of starting the lane change, and another vehicle is not present in the adjacent lane which is the destination of the lane change, but when there is sufficient space for the autonomous driving vehicle 2 to enter between the adjacent lane which is the destination of the lane change and the other vehicle, and it is possible to secure enough distance to perform the lane change up to the end position of the section where the lane change is permitted, and when another vehicle of which the possibility of collision is equal to or higher than the determination threshold value is not present on the target route of the autonomous driving vehicle 2 in lane change, the remote instruction request determination unit 37 may determine that the remote instruction request unnecessity condition is not satisfied.

If the remote instruction location situation is a situation of passing the intersection having the traffic signal, and when a likelihood of determining that the traffic signal is in the passing prohibition state (for example, a red signal) is equal to or higher than a first likelihood threshold value, the remote instruction request determination unit 37 may determine that the remote instruction request unnecessity condition is satisfied. The first likelihood threshold value is a threshold value having a value set in advance. The determination of the traffic signal is performed by, for example, image processing, and the likelihood of determination using the image processing can be obtained by a known method.

In addition, if a difference between the likelihood of determining that the traffic signal is in the passing prohibited state and the likelihood of determining that the traffic signal is in a passing permitted state (for example, a green signal) is equal to or greater than a difference threshold value, the remote instruction request determination unit 37 may determine that the remote instruction request unnecessity condition is satisfied. The difference threshold value is a threshold value having a value set in advance.

When the likelihood of determining that the traffic signal is in the passing permitted state is equal to or higher than the second likelihood threshold value, and the difference between the likelihood of determining that the traffic signal is in the passing permitted state and the likelihood of determining that the passing permitted state is equal to or greater than the difference threshold value, the remote instruction request determination unit 37 may determine that the remote instruction request unnecessity condition is satisfied, assuming that progressing is possible without requesting the remote commander R for the determination.

On the other hand, when the likelihood of determining that the traffic signal is in the passing prohibited state is lower than the first likelihood threshold value, and the likelihood of determining that the traffic signal is in the passing permitted state is lower than the second likelihood threshold value, the remote instruction request determination unit 37 may determine that the remote instruction request unnecessity condition is not satisfied. When the difference between the likelihood of determining that the traffic signal is in the passing permitted state and the likelihood of determining that the passing prohibited state is less than the difference threshold value, the remote instruction request determination unit 37 may determine that the remote instruction request unnecessity condition is not satisfied.

If the remote instruction location situation is the turning left from the T-shape road (without traffic signal) to the priority road, and when another vehicle is present at an approaching destination of the autonomous driving vehicle 2, the remote instruction request determination unit 37 may determine that the remote instruction request unnecessity condition is satisfied because there are no other choices. When the possibility of collision between another vehicle approaching the lane of the approaching destination (on the lane intersecting the target route) from the right side of the autonomous driving vehicle 2 and the autonomous driving vehicle 2 is equal to or higher than the determination threshold value, the remote instruction request determination unit 37 may determine that the remote instruction request unnecessity condition is satisfied.

If another vehicle is not present at the approaching destination of the autonomous driving vehicle 2 and another vehicle positioned at the right side of autonomous driving vehicle 2 on the lane of the approaching destination is stopped, the remote instruction request determination unit 37 may determine that the remote instruction request unnecessity condition is satisfied assuming that the left turn can be performed by the autonomous driving without requesting the remote commander R for the determination. If the other vehicle positioned at the right side of autonomous driving vehicle 2 on the lane of the approaching destination is stopped, the remote instruction request determination unit 37 may determine that the remote instruction request unnecessity condition is satisfied. If another vehicle is not present at the approaching destination of the autonomous driving vehicle 2 and another vehicle positioned at the right side of the autonomous driving vehicle 2 on the lane of the approaching destination is not present, the remote instruction request determination unit 37 may determine that the remote instruction request unnecessity condition is satisfied.

On the other hand, when another vehicle is not present at the approaching destination of the autonomous driving vehicle 2, another vehicle positioned at the right side of autonomous driving vehicle 2 on the lane of the approaching destination is not stopped, and the possibility of collision between another vehicle positioned at the right side of the autonomous driving vehicle 2 on the lane of the approaching destination and the autonomous driving vehicle 2 is equal to or higher than the determination threshold value, the remote instruction request determination unit 37 may determine that the remote instruction request unnecessity condition is not satisfied.

In addition, for the remote instruction location situation in which the occurrence position cannot be specified from the map information, when the remote instruction location situation recognition unit 34 recognizes the remote instruction location situation from the external environment of the autonomous driving vehicle 2, the remote instruction request determination unit 37 may determine whether or not the remote instruction request unnecessity condition is satisfied.

For example, if the remote instruction location situation is a situation of offset avoidance for the front obstacle, when an avoidance space (space for avoidance in both the lane width direction and lane length direction) cannot be secured due to the presence of other vehicles traveling the adjacent lane or due to being close to the intersection, the remote instruction request determination unit 37 may determine that the remote instruction request unnecessity condition is satisfied because there are no other choices. When an obstacle such as a parking vehicle does not protrude to the center of the lane, and the obstacle is stopping or traveling at a low speed, and it is possible to secure an avoidance space in the lane, the remote instruction request determination unit 37 may determine that the remote instruction request unnecessity condition is satisfied assuming that the offset avoidance can be performed by the autonomous driving without requesting the remote commander R for the determination.

On the other hand, when an obstacle such as a parking vehicle protrudes to the center of the lane, and it is not possible to secure an avoidance space in the lane, but when the avoidance space can be secured by protruding to the adjacent lane, and another vehicle is not present in the adjacent lane, the remote instruction request determination unit 37 may determine that the remote instruction request unnecessity condition is not satisfied. When an obstacle such as a bicycle travel travels at a certain speed or more, and it is not possible to secure the avoidance space in the lane considering the margin, but when the avoidance space can be secured by protruding to the adjacent lane, and another vehicle is not present in the adjacent lane, the remote instruction request determination unit 37 may determine that the remote instruction request unnecessity condition is not satisfied. The above-described determination content can be applied to a case where the remote instruction location situation is a situation of overtaking the bicycle.

If the remote instruction location situation is a situation of avoiding a falling object, and when the height of the falling object is equal to or greater than a vehicle height threshold value or a width of the falling object is equal to or greater than a tread threshold value, the remote instruction request determination unit 37 may determine that the remote instruction request unnecessity condition is satisfied. The vehicle height threshold value and the tread threshold value are threshold values having values set in advance, respectively. The vehicle height threshold value corresponds to, for example, a vehicle height of the autonomous driving vehicle 2. The tread threshold value corresponds to, for example, a tread of the autonomous driving vehicle 2.

When the height of the falling object is less than the vehicle height threshold value and the width of the falling object is less than the tread threshold value, the remote instruction request determination unit 37 may determine that the remote instruction request unnecessity condition is satisfied assuming that it is possible to straddle the falling object without requesting the remote commander R for the determination. On the other hand, when the height or width of the falling object cannot be detected, the remote instruction request determination unit 37 may determine that the remote instruction request unnecessity condition is not satisfied.

Alternatively, if the remote instruction location situation is a situation of avoiding the falling object, when the height of the falling object is equal to or greater than the vehicle height threshold value or cannot be detected, and the avoidance space cannot be secured due to the presence of other vehicles traveling the adjacent lane or due to being close to the intersection, the remote instruction request determination unit 37 may determine that the remote instruction request unnecessity condition is satisfied because there are no other choices. If the remote instruction location situation is a situation of avoiding the falling object, when the height of the falling object is equal to or greater than the vehicle height threshold value or cannot be detected, and when the avoidance space can be secured in the lane, the remote instruction request determination unit 37 may determine that the remote instruction request unnecessity condition is satisfied assuming that the width-direction avoidance of the falling object can be performed by the autonomous driving without requesting the remote commander R for the determination.

On the other hand, if the height of the falling object is equal to or greater than the vehicle height threshold value or cannot be detected and the avoidance space cannot be secured in the lane, but when the avoidance space can be secured by protruding to the adjacent lane, and when other vehicles are not present in the adjacent lane, the remote instruction request determination unit 37 may determine that the remote instruction request unnecessity condition is not satisfied. That is, it is conceivable that the autonomous driving vehicle 2 may temporarily protrude to the adjacent lane to avoid the falling object when the remote commander gives the remote instruction.

If the remote instruction location situation is a situation of approaching the roundabout, when the possibility of collision between another vehicle traveling in the roundabout and the autonomous driving vehicle 2 is equal to or higher than the determination threshold value, the remote instruction request determination unit 37 may determine that the remote instruction request unnecessity condition is satisfied. If another vehicle is not present in the roundabout, the remote instruction request determination unit 37 may determine that the remote instruction request unnecessity condition is satisfied assuming that entering the roundabout can be performed by the autonomous driving without requesting the remote commander R for the determination.

On the other hand, if another vehicle traveling in the roundabout is present, but the possibility of collision between the other vehicle traveling in the roundabout and the autonomous driving vehicle 2 is lower than the determination threshold value, the remote instruction request determination unit 37 may determine that the remote instruction request unnecessity condition is not satisfied.

If the remote instruction request unnecessity condition is satisfied, the remote instruction request determination unit 37 determines that the remote instruction request is unnecessary. If the remote instruction request unnecessity condition is not satisfied, the remote instruction request determination unit 37 determines that the remote instruction request is necessary. If it is determined that the remote instruction request is necessary, the remote instruction request determination unit 37 requests the remote instruction server 10 of the remote instruction apparatus 1 for the remote instruction. The remote instruction request determination unit 37 requests for the remote instruction via the communication unit 25. The remote instruction request determination unit 37 transmits the information on the autonomous driving vehicle 2 necessary for the remote commander to make the determination (for example, an image captured by the camera in front of the autonomous driving vehicle 2) to the remote instruction server 10.

The trajectory generation unit 38 generates a trajectory used for the autonomous driving of the autonomous driving vehicle 2. The trajectory generation unit 38 generates the trajectory for the autonomous driving based on the target route set in advance, the map information, the position information of the autonomous driving vehicle 2, the external environment of the autonomous driving vehicle 2, and the travel state of the autonomous driving vehicle 2. The trajectory corresponds to a travel plan for the autonomous driving.

The trajectory includes a path through which the vehicle travels by the autonomous driving and a vehicle speed plan in the autonomous driving. The path is a trace on the target route on which the vehicle in the autonomous driving travels. The path can be, for example, data of a change of the steering angle of the autonomous driving vehicle 2 according to the position on the target route (steering angle plan). The position on the target route is, for example, a set longitudinal positions set in a predetermined interval (for example, 1 m) in the progressing direction of the target route. The steering angle plan is data in which a target steering angle is associated with each set longitudinal position. The target route used in the above description may be replaced with the path. The path is generated based on the target route.

The trajectory generation unit 38 generates the path on which the autonomous driving vehicle 2 travels, based on, for example, the target route, the map information, the external environment of the autonomous driving vehicle 2 and the travel state of the autonomous driving vehicle 2. The trajectory generation unit 38 generates the path such that, for example, the autonomous driving vehicle 2 passes through the center of the lane included in the target route (the center in the lane width direction).

The vehicle speed plan is data in which a target vehicle speed is associated with each set longitudinal position, for example. The set longitudinal position may be set based on the travel time of the autonomous driving vehicle 2 instead of the distance. The set longitudinal position may be set as, for example, the arrival position of the vehicle one second later, or the arrival position of the vehicle two seconds later. In this case, the vehicle speed plan can also be expressed as data corresponding to the travel time.

The trajectory generation unit 38 generates the vehicle speed plan based on the path and traffic regulation information such as the legal maximum speed included in the map information. Instead of the legal maximum speed, a speed set in advance for a position or a section on the map may be used. The trajectory generation unit 38 generates the trajectory for the autonomous driving from the path and the vehicle speed plan. The method of generating the trajectory by the trajectory generation unit 38 is not limited to the above-described content, and a known method relating to the autonomous driving can be adopted. The same applies to the content of the trajectory.

When the remote instruction request determination unit 37 requests the remote instruction server 10 for the remote instruction or when the autonomous driving vehicle 2 approaches the occurrence position of the remote instruction location situation, the trajectory generation unit 38 may generate the trajectory according to the remote instruction in advance. The content of the remote instruction is determined in advance according to the situation of the autonomous driving vehicle 2. For example, the content of the remote instruction at the time of turning right at an intersection includes a remote instruction to "progress (to start of turning right)" and a remote instruction to "stop (determination pending)". The content of the remote instruction at the time of turning right at the intersection may include a remote instruction to go straight without turning right (remote instruction to change the route) or a remote instruction to perform the emergency evacuation.

For example, in the situation of turning right at the intersection, the trajectory generation unit 38 generates the trajectory for the autonomous driving vehicle 2 to turn right at the intersection such that the autonomous driving vehicle 2 follows the remote instruction to start the right turn (progressing). The trajectory generation unit 38 may update the trajectory according to the change of the external environment until the remote instruction is received. In addition, if there is a remote instruction to switch from turning right at the intersection to going straight ahead at the intersection, the trajectory generation unit 38 may generate a trajectory that goes straight ahead at the intersection.

The autonomous driving control unit 39 performs the autonomous driving of the autonomous driving vehicle 2. The autonomous driving control unit 39 performs the autonomous driving of the autonomous driving vehicle 2 based on, for example, the external environment of the autonomous driving vehicle 2, the travel state of the autonomous driving vehicle 2, and the trajectory generated by the trajectory generation unit 38. The autonomous driving control unit 39 performs the autonomous driving of the autonomous driving vehicle 2 by transmitting a control signal to the actuator 26.

If the remote instruction is requested to the remote instruction server 10 by the remote instruction request determination unit 37, the autonomous driving control unit 39 waits for the reception of the remote instruction from the remote instruction server 10. If the remote instruction is requested after the autonomous driving vehicle 2 stops, the autonomous driving control unit 39 remains the stopped state until the remote instruction is received.

If the occupant having a driver's license is on board and when the remote instruction is not received even after a waiting time set in advance has elapsed, the autonomous driving control unit 39 may require a determination by the occupant or the manual driving. If the remote instruction is not received even after the waiting time has elapsed, and the determination by the occupant or the manual driving is not possible (a case where the occupant is not on board, or the like), the autonomous driving control unit 39 may perform the emergency evacuation autonomously.

If it is determined by the remote instruction request determination unit 37 that the remote instruction is not requested, the autonomous driving control unit 39 may determine the behavior of the autonomous driving vehicle 2 in the remote instruction location situation. Specifically, if the remote instruction location situation is a situation of turning right at the intersection, when another vehicle is present on the lane intersecting the target route of the autonomous driving vehicle 2, the autonomous driving control unit 39 waits at a right turn waiting position in the intersection, as a passive autonomous determination. The right turn waiting position is, for example, a position of the stop line for waiting for the right turn. The right turn waiting position may be a position where the autonomous driving vehicle 2 starts to cut the steering angle in the autonomous driving.

In addition, if another vehicle is not present on the lane intersecting the target route, and the blind area determination unit 35 determines that the sensor blind area is present, and the possibility of collision between the virtual object and the autonomous driving vehicle 2 is equal to or higher than the second threshold value which is larger than the first threshold value, the autonomous driving control unit 39 may wait at a right turn waiting position in the intersection, as the passive autonomous determination.

On the other hand, when another vehicle is not present on the lane intersecting the target route of the autonomous driving vehicle 2 and the blind area determination unit 35 determines that the sensor blind area is not present, the autonomous driving control unit 39 may perform the right turn at the intersection along the target route by the autonomous driving, as a positive autonomous determination. For example, the autonomous driving control unit 39 performs the right turn within the range of the set upper limit acceleration. The autonomous driving control unit 39 can set the upper limit acceleration when turning right without receiving the remote instruction to a value smaller than the upper limit acceleration when turning right after receiving the remote instruction to progress.

In addition, when another vehicle is not present on the lane intersecting the target route of the autonomous driving vehicle 2, and the blind area determination unit 35 determines that the sensor blind area is present, but when the possibility of collision between the virtual object and the autonomous driving vehicle 2 calculated by the first collision possibility calculation unit 36 is lower than the first threshold value, the autonomous driving control unit 39 may perform the right turn at the intersection by the autonomous driving, as the positive autonomous determination.

If the remote instruction location situation is a situation of starting the lane change, and when there is no enough space for the autonomous driving vehicle 2 to enter between the adjacent lane which is the destination of the lane change and other vehicles, the autonomous driving control unit 39 travels while keeping the currently traveling lane, as a passive autonomous determination. The autonomous driving control unit 39 may perform deceleration or acceleration of the autonomous driving vehicle 2 in order to secure a space enough for the autonomous driving vehicle 2 to enter between other vehicles, or may turn on a direction indicator.

When it is not possible to secure enough distance to perform the lane change up to the end position of the section where the lane change is permitted, the autonomous driving control unit 39 may travel while keeping the currently traveling lane, as the passive autonomous determination. When another vehicle approaching from behind is recognized in the adjacent lane, and the possibility of collision between the autonomous driving vehicle 2 that changes lane and the other vehicle is equal to or greater than the determination threshold value, the autonomous driving control unit 39 may travel while keeping the currently traveling lane, as the passive autonomous determination.

When another vehicle is not present in the adjacent lane which is the destination of the lane change and it is possible to secure enough distance to perform the lane change up to the end position in the section where the lane change is permitted, the autonomous driving control unit 39 may perform the lane change, as the positive autonomous determination.

If the remote instruction location situation is a situation of passing the intersection having the traffic signal, and when the likelihood of determining that the traffic signal is in the passing prohibited state is equal to or higher than the first likelihood threshold value, the autonomous driving control unit 39 may cause the autonomous driving vehicle 2 to stop at the stop line, as the passive autonomous determination. The autonomous driving control unit 39 stops behind the preceding vehicle if there is a stopping vehicle on the stop line. In addition, when the difference between the likelihood of determining that the traffic signal is in the passing prohibited state and the likelihood of determining that the traffic signal is in the passing permitted state (for example, a green signal) is equal to or greater than the difference threshold value, the autonomous driving control unit 39 may cause the autonomous driving vehicle 2 to stop at the stop line, as the passive autonomous determination.

When the likelihood of determining that the traffic signal is in the passing permitted state is equal to or higher than the second likelihood threshold value, and the difference between the likelihood of determining that the traffic signal is in the passing permitted state and the likelihood of determining that in the passing permitted state is equal to or greater than the difference threshold value, the autonomous driving control unit 39 may pass through the intersection having the traffic signal, as the positive autonomous determination. For example, the autonomous driving control unit 39 performs the right turn within the range of the set upper limit acceleration. The autonomous driving control unit 39 can set the upper limit acceleration when passing without receiving the remote instruction to a value smaller than the upper limit acceleration when passing while receiving the remote instruction to progress.

When the remote instruction location situation is a situation of turning left from the T-shape road to the priority road, and when another vehicle is present in the approaching destination of the autonomous driving vehicle 2, the autonomous driving control unit 39 may cause the autonomous driving vehicle 2 to stop at a position for peeking to the priority road, as the passive autonomous determination. The position for peeking is not particularly limited, and for example, the position for peeking may be a position at which the driver can visually recognize another vehicle traveling on the priority road on the right side of the autonomous driving vehicle 2.

When the possibility of collision between another vehicle approaching the lane of the approaching destination (on the lane intersecting the target route) from the right side of the autonomous driving vehicle 2 and the autonomous driving vehicle 2 is equal to or higher than the determination threshold value, the autonomous driving control unit 39 may stop the autonomous driving vehicle 2 at the position for peeking to the priority road, as the passive autonomous determination.

If another vehicle is not present in the approaching destination of the autonomous driving vehicle 2 and when another vehicle positioned on the right side of the autonomous driving vehicle 2 is stopped on the lane of the approaching destination, the autonomous driving control unit 39 may perform the left turn by the autonomous driving, as the positive autonomous determination. Alternatively, if another vehicle positioned on the right side of the autonomous driving vehicle 2 is stopped on the lane of the approaching destination, the autonomous driving control unit 39 may perform the left turn by the autonomous driving, as the positive autonomous determination. If another vehicle is not present in the approaching destination of the autonomous driving vehicle 2 and when another vehicle positioned on the right side of autonomous driving vehicle 2 is not present on the lane of the approaching destination, the autonomous driving control unit 39 may perform the left turn by the autonomous driving, as the positive autonomous determination.

If the remote instruction location situation is a situation of offset avoidance for the obstacle ahead, when the avoidance space (space in both the lane width direction and the lane length direction) cannot be secured due to the existence of another vehicle traveling on the adjacent lane or due to being close to the intersection, the autonomous driving control unit 39 may stop the vehicle before the obstacle, as the passive autonomous determination. When the obstacle such as the parking vehicle does not protrude to the center of the lane, and when the avoidance space can be secured in the lane because the obstacle is stopping or travels at a low speed, the autonomous driving control unit 39 may perform the offset avoidance, as the positive autonomous determination.

If the remote instruction location situation is a situation of avoiding a falling object, when the height of the falling object is equal to or greater than the vehicle height threshold value or the width of the falling object is equal to or greater than the tread threshold value, the autonomous driving control unit 39 may stop the vehicle just before the falling object, as the passive autonomous determination. When the height of the falling object is less than the vehicle height threshold value and the width of the falling object is less than the tread threshold value, the autonomous driving control unit 39 may travel over the falling object at a low speed, as the positive autonomous determination.

Alternatively, when the height of the falling object is equal to or greater than the vehicle height threshold value or cannot be detected, and the avoidance space cannot be secured due to the presence of other vehicles that travel along the adjacent lane or due to being close to the intersections, the autonomous driving control unit 39 may stop the vehicle just before the falling object, as the passive autonomous determination. When the height of the falling object is equal to or greater than the vehicle height threshold value or cannot be detected, and when the avoidance space can be secured in the lane, the autonomous driving control unit 39 may laterally avoid the falling object, as the positive autonomous determination.

If the remote instruction location situation is a situation of entering the roundabout, when the possibility of collision between another vehicle traveling in the roundabout and the autonomous driving vehicle 2 is equal to or higher than the determination threshold value, the autonomous driving control unit 39 may stop the vehicle before the roundabout, as the passive autonomous determination. If another vehicle is not present in the roundabout, the autonomous driving control unit 39 may enter the roundabout, as the positive autonomous determination.

Processing by Autonomous Driving System

Figure 4A:
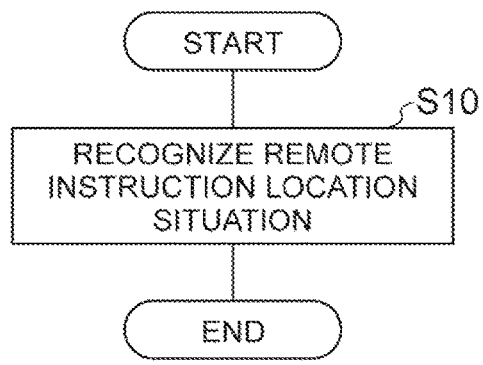
FIG. 4A is a flowchart illustrating an example of remote instruction location situation recognition processing.

Next, processing by the autonomous driving system 100 according to the first embodiment will be described with reference to the drawings. FIG. 4A is a flowchart illustrating an example of remote instruction location situation recognition processing. The remote instruction location situation recognition processing is performed, for example, when the autonomous driving is started.

As illustrated in FIG. 4A, in S10, the autonomous driving ECU 20 recognizes the remote instruction location situation using the remote instruction location situation recognition unit 34. The remote instruction location situation recognition unit 34 recognizes the remote instruction location situation on the target route based on the target route of the autonomous driving vehicle set in advance, the position of the autonomous driving vehicle on the map, and the map information. Thereafter, the autonomous driving ECU 20 ends the current processing.

The remote instruction location situation recognition unit 34 may recognize all the remote instruction location situations on the target route that can be recognized from the map information by starting the autonomous driving, or may recognize only the remote instruction location situations up to a certain distance ahead on the target route. When recognizing only the remote instruction location situation up to a certain distance ahead, the remote instruction location situation recognition unit 34 performs the remote instruction location situation recognition processing up to a certain distance ahead again according to the traveling of the autonomous driving vehicle 2.

Figure 4B:
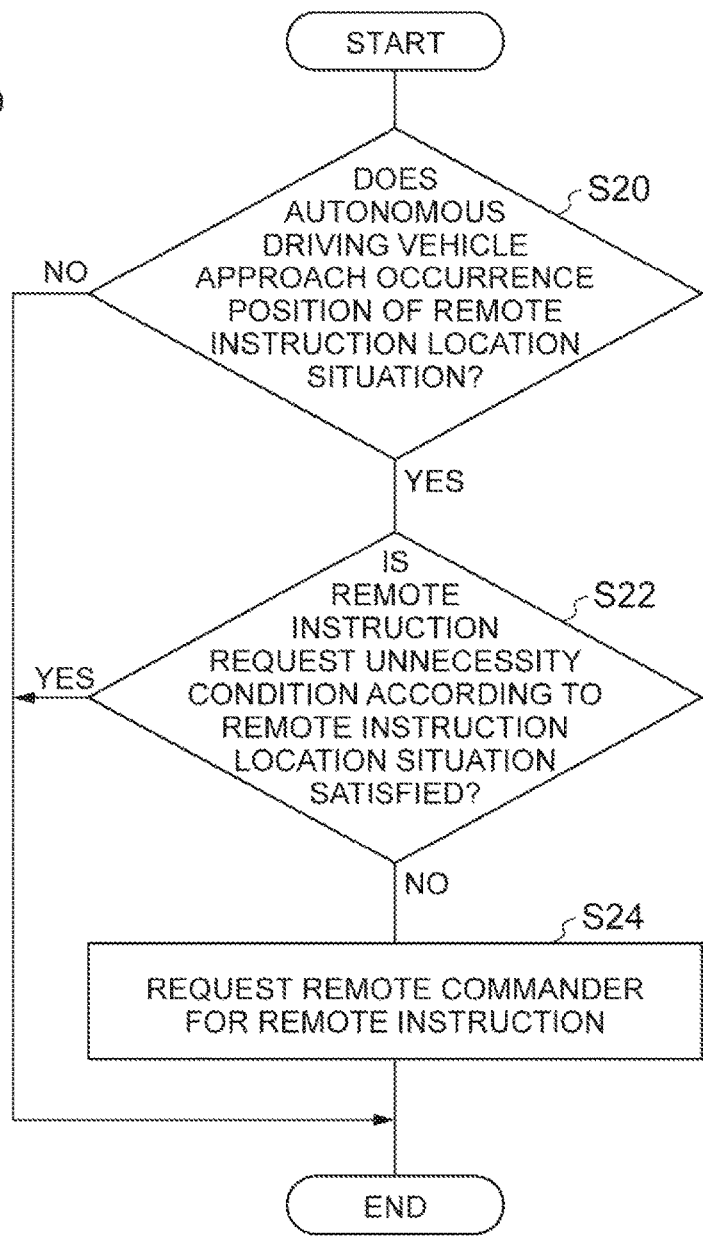
FIG. 4B is a flowchart illustrating an example of remote instruction request determination processing.

FIG. 4B is a flowchart illustrating an example of remote instruction request determination processing. The remote instruction request determination processing is performed during the autonomous driving of the autonomous driving vehicle 2.

As illustrated in FIG. 4B, in S20, the autonomous driving ECU 20 determines whether or not the autonomous driving vehicle 2 approaches the occurrence position of the remote instruction location situation using the remote instruction request determination unit 37. For example, if the distance between the autonomous driving vehicle 2 on the target route and the occurrence position of the remote instruction location situation is shorter than the approach determination threshold value, the remote instruction request determination unit 37 determines that the autonomous driving vehicle 2 approaches the occurrence position of the remote instruction location situation. If it is determined that the autonomous driving vehicle 2 approaches the occurrence position of the remote instruction location situation (YES in S20), autonomous driving ECU 20 proceeds the process to S22. If it is not determined that the autonomous driving vehicle 2 approaches the occurrence position of the remote instruction location situation (NO in S20), the autonomous driving ECU 20 ends the current processing.

In S22, the autonomous driving ECU 20 determines whether the remote instruction request unnecessity condition is satisfied or not using the remote instruction request determination unit 37. The remote instruction request determination unit 37 determines whether the remote instruction request unnecessity condition according to the remote instruction location situation is satisfied or not based on the external environment of the autonomous driving vehicle 2. If it is determined that the remote instruction request unnecessity condition is satisfied (YES in S22), the autonomous driving ECU 20 ends the current processing. If it is not determined that the remote instruction request unnecessity condition is satisfied (NO in S22), the autonomous driving ECU 20 makes the process proceed to S24.

In S24, the autonomous driving ECU 20 performs the remote instruction request to the remote commander R using the remote instruction request determination unit 37. The remote instruction request determination unit 37 requests the remote instruction server 10 of the remote instruction apparatus 1 for the remote instruction via the communication unit 25. The remote instruction request determination unit 37 transmits information on the autonomous driving vehicle 2 necessary for the remote commander to make a determination, to the remote instruction server 10. Thereafter, the autonomous driving ECU 20 ends the current processing.

Figure 5:
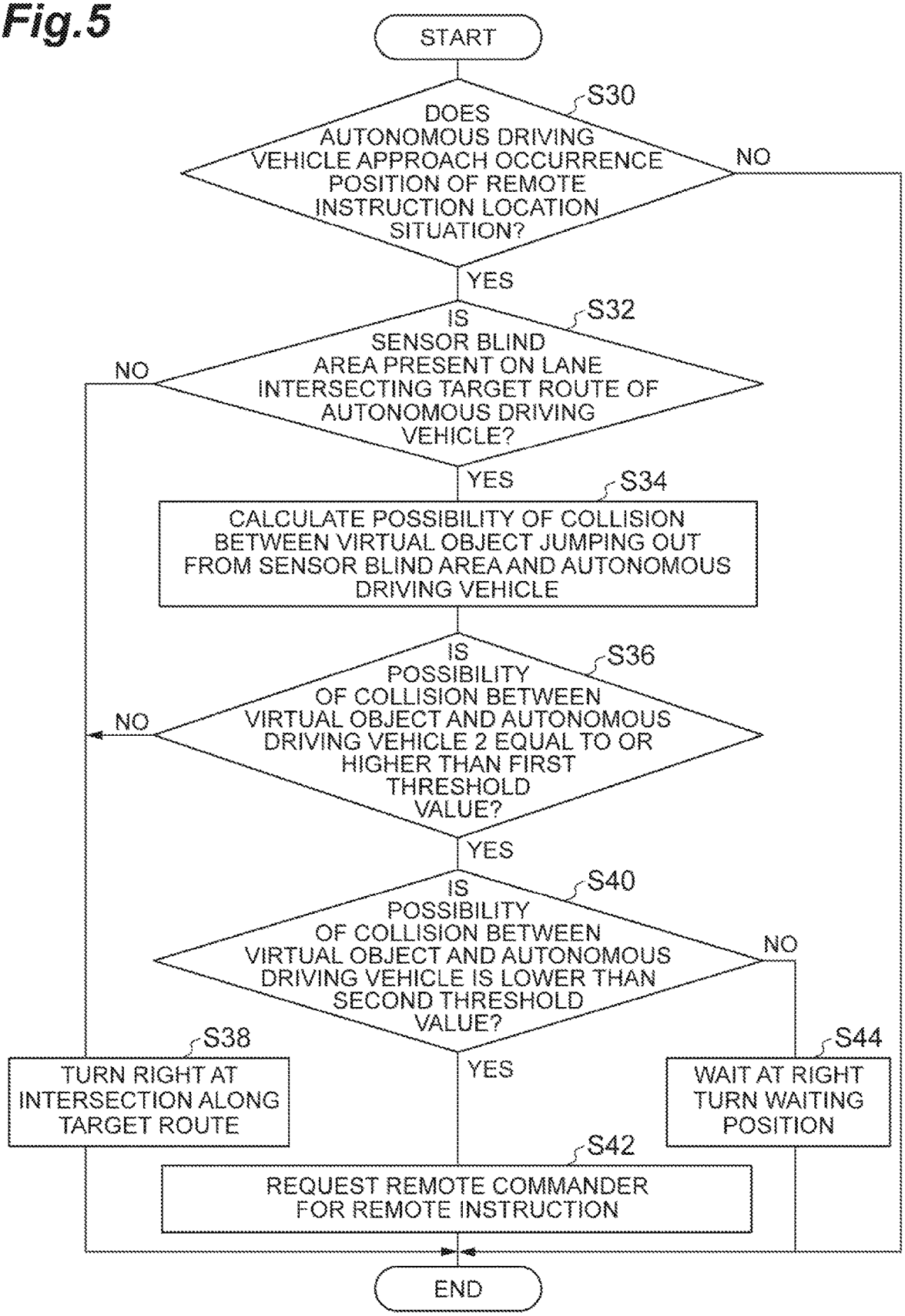
FIG. 5 is a flowchart illustrating a specific example of the remote instruction request determination processing when a remote instruction location situation is a situation of turning right at an intersection.

FIG. 5 is a flowchart illustrating a specific example of the remote instruction request determination processing when the remote instruction location situation is a situation of turning right at the intersection.

As illustrated in FIG. 5, in S30, the autonomous driving ECU 20 determines whether or not the autonomous driving vehicle 2 approaches the occurrence position of the remote instruction location situation using the remote instruction request determination unit 37. If it is determined that the autonomous driving vehicle 2 approaches the occurrence position of the remote instruction location situation (YES in S30), the autonomous driving ECU 20 makes the process proceed to S32. If it is not determined that the autonomous driving vehicle 2 approaches the occurrence position of the remote instruction location situation (NO in S30), the autonomous driving ECU 20 ends the current processing.

In S32, the autonomous driving ECU 20 determines whether or not the sensor blind area is present on the lane intersecting the target route of the autonomous driving vehicle 2 using the blind area determination unit 35. The blind area determination unit 35 performs the above-described determination based on the target route of the autonomous driving vehicle 2 and the external environment of the autonomous driving vehicle 2. If it is determined that the sensor blind area is present (YES in S32, the autonomous driving ECU 20 makes the process proceed to S34. If it is not determined that the sensor blind area is present (NO in S32, the autonomous driving ECU 20 makes the process proceed to S38.

In S34, the autonomous driving ECU 20 calculates the possibility of collision between the virtual object jumping out from the sensor blind area and the autonomous driving vehicle 2 using the first collision possibility calculation unit 36. The first collision possibility calculation unit 36 calculates the possibility of collision assuming that the virtual object jumps out at a speed set in advance. Thereafter, the autonomous driving ECU 20 makes the process proceed to S36.

In S36, the autonomous driving ECU 20 determines whether or not the possibility of collision between the virtual object and the autonomous driving vehicle 2 is equal to or higher than the first threshold value using the remote instruction request determination unit 37. If it is determined that the possibility of collision between the virtual object and the autonomous driving vehicle 2 is equal to or higher than the first threshold value (YES in S36), the autonomous driving ECU 20 makes the process proceed to S40. If it is not determined that the possibility of collision between the virtual object and the autonomous driving vehicle 2 is equal to or higher than the first threshold value (NO in S36), the autonomous driving ECU 20 makes the process proceed to S38.

In S38, the autonomous driving ECU 20 performs the right turn at the intersection along the target route using the autonomous driving control unit 39. The autonomous driving control unit 39 performs the right turn of the autonomous driving vehicle 2 at the intersection by transmitting a control signal to the actuator 26. Thereafter, the autonomous driving ECU 20 ends the current processing.

In S40, the autonomous driving ECU 20 determines whether or not the possibility of collision between the virtual object and the autonomous driving vehicle 2 is lower than the second threshold value using the remote instruction request determination unit 37. The second threshold value is a threshold value having a value larger than the first threshold value. If it is determined that the possibility of collision between the virtual object and the autonomous driving vehicle 2 is lower than the second threshold value (YES in S40), the autonomous driving ECU 20 makes the process proceed to S42. If it is not determined that the possibility of collision between the virtual object and the autonomous driving vehicle 2 is lower than the second threshold value (NO in S40), the autonomous driving ECU 20 makes the process proceed to S44.

In S42, the autonomous driving ECU 20 performs the remote instruction request to the remote commander R (remote instruction apparatus 1) using the remote instruction request determination unit 37. Thereafter, the autonomous driving ECU 20 ends the current processing.

In S44, the autonomous driving ECU 20 performs waiting at the right turn waiting position of the autonomous driving vehicle 2 using the autonomous driving control unit 39. The autonomous driving control unit 39 causes the autonomous driving vehicle 2 to wait at the right turn waiting position by transmitting a control signal to the actuator 26. Thereafter, the autonomous driving ECU 20 ends the current processing.

Operational Effects of Autonomous Driving System in First Embodiment

According to the autonomous driving system 100 in the first embodiment described above, the remote instruction location situation on the target route of the autonomous driving vehicle 2 is recognized and whether or not to request the remote commander R for the remote instruction with regard to the remote instruction location situation is determined based on the external environment of the autonomous driving vehicle 2, therefore, it is possible to suppress the decrease of the travel efficiency of the autonomous driving vehicle 2 caused by the frequent remote instruction requests compared to a case of always requesting for the remote instruction in the remote instruction location situation.

In addition, in the autonomous driving system 100, if the sensor blind area is present on the lane intersecting the target route of the autonomous driving vehicle 2 in the remote instruction location situation, the possibility of collision between the virtual object that is assumed to jump out from the sensor blind area at a speed set in advance and the autonomous driving vehicle 2 is calculated, and if the possibility of collision is lower than the first threshold value or equal to or higher than the second threshold value that is greater than the first threshold value, it is determined that the remote instruction is not requested. Therefore, according to the autonomous driving system 100, since the remote instruction is not requested to the remote commander R when there is little need to be confused in the determination of the autonomous driving vehicle 2 even if the virtual object is taken into consideration, it is possible to suppress the decrease of the travel efficiency of the autonomous driving vehicle 2 caused by the frequent remote instruction requests.

Furthermore, according to the autonomous driving system 100, the autonomous driving vehicle 2 continues to travel along the target route by the autonomous driving if it is determined that the remote instruction is not requested because the low possibility of collision between the virtual object and the autonomous driving vehicle 2 is low, or the autonomous driving vehicle 2 is stopped if it is determined that the remote instruction is not requested because the possibility of collision between the virtual object and the autonomous driving vehicle 2 is high, therefore, it is possible to suppress the decrease of the travel efficiency of the autonomous driving vehicle 2.

Second Embodiment

Figure 6:
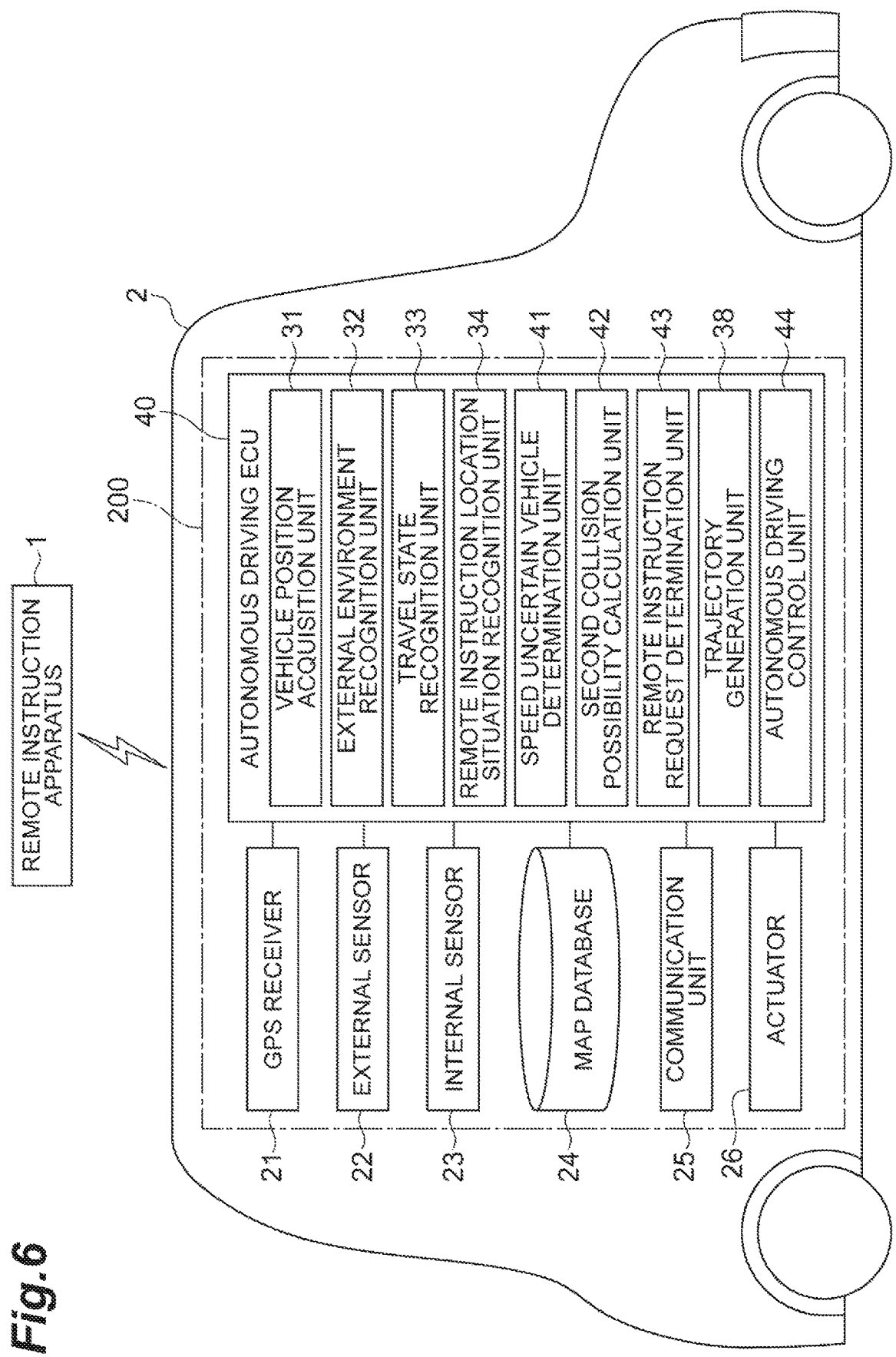
FIG. 6 is a block diagram illustrating an example of an autonomous driving system according to a second embodiment.

Next, an autonomous driving system according to a second embodiment will be described with reference to the drawings. FIG. 6 is a block diagram illustrating an example of the autonomous driving system according to the second embodiment.

Configuration of Autonomous Driving System in Second Embodiment

An autonomous driving ECU 40 of an autonomous driving system 200 illustrated in FIG. 6 is different from the autonomous driving ECU 20 in the first embodiment in points that a speed uncertain vehicle determination unit 41 and a second collision possibility calculation unit 42 are included instead of the blind area determination unit 35 and the first collision possibility calculation unit 36, and that the remote instruction request determination unit 43 and the autonomous driving control unit 44 have different functions respectively.

When the autonomous driving vehicle 2 approaches the occurrence position of the remote instruction location situation, the speed uncertain vehicle determination unit 41 determines whether or not a speed uncertain vehicle is present on the lane intersecting the target route of the autonomous driving vehicle 2 in the remote instruction location situation based on the target route of the autonomous driving vehicle 2 and the external environment of the autonomous driving vehicle 2. The remote instruction location situation may be limited to the situation of turning right at the intersection, may be limited to the situation of passing through the intersection without a traffic signal, or may be limited to the situation of turning left from the T-shape road to the priority road.

A speed uncertain vehicle is another vehicle of which a speed is uncertain. The speed uncertain vehicle occurs, for example, when the vehicle is included in the image captured by the camera of the autonomous driving vehicle 2 but the speed is not detected because it is not within the detection range of the radar sensor. The speed uncertain vehicle may include another vehicle that is in the image captured by the camera but the speed of which cannot be estimated with sufficient accuracy by the image processing because of a long distance. It is not essential that the autonomous driving vehicle 2 includes a radar sensor.

Figure 7:
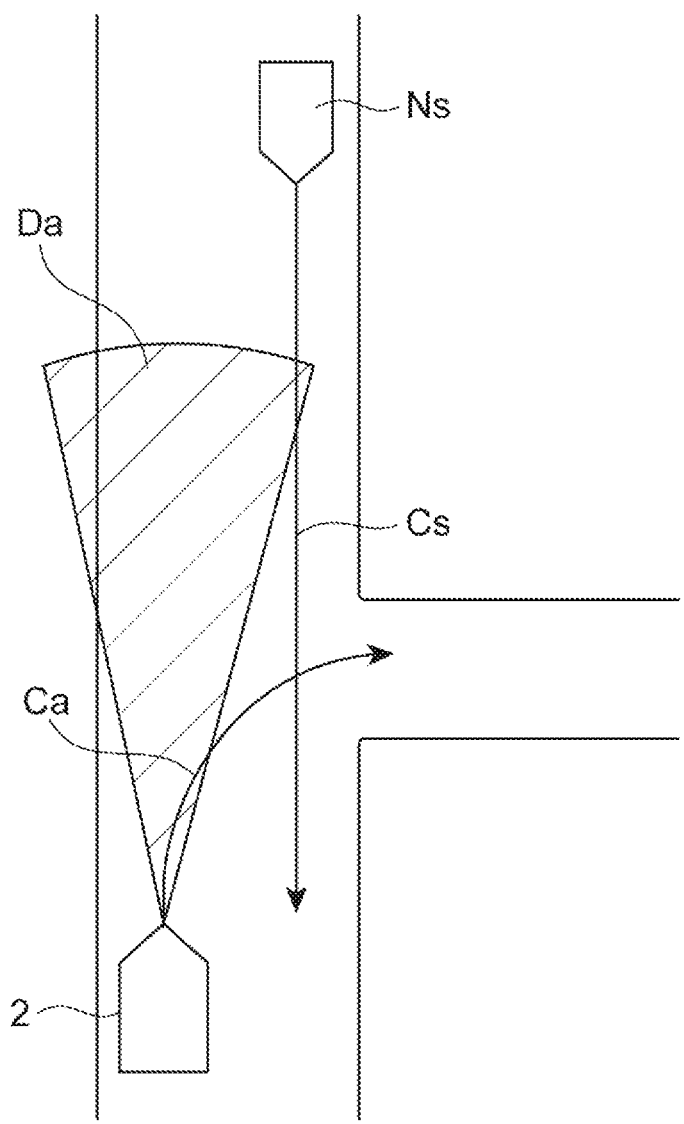
FIG. 7 is a plan view illustrating an example of a speed uncertain vehicle.

Here, FIG. 7 is a plan view illustrating an example of a speed uncertain vehicle. FIG. 7 illustrates a situation in which the autonomous driving vehicle 2 turns right at the intersection as the remote instruction location situation. FIG. 7 illustrates a detection range Da of the radar sensor of the autonomous driving vehicle 2, a speed uncertain vehicle Ns, and a progressing route Cs of the speed uncertain vehicle Ns. The speed uncertain vehicle Ns is an oncoming vehicle traveling toward the autonomous driving vehicle 2 from the front of the autonomous driving vehicle 2. The progressing route Cv of the speed uncertain vehicle Ns intersects the target route Ca of the autonomous driving vehicle 2 that is turning right. Although the speed uncertain vehicle Ns is included in the image captured by the camera of the autonomous driving vehicle 2, the speed is not detected because it is not included in the detection range Da of the radar sensor.

In the situation illustrated in FIG. 7, the speed uncertain vehicle determination unit 41 determines that the speed uncertain vehicle Ns if which the speed is uncertain is present based on the target route of the autonomous driving vehicle 2 and the external environment of the autonomous driving vehicle 2.

If it is determined by the speed uncertain vehicle determination unit 41 that the speed uncertain vehicle is present, the second collision possibility calculation unit 42 calculates a possibility of collision between the speed uncertain vehicle and the autonomous driving vehicle 2 under an assumption that the speed uncertain vehicle is approaching at a speed set in advance when the autonomous driving vehicle 2 continues the travel on the target route by the autonomous driving. As a method of setting the speed set in advance, a method similar to that in the case of the virtual object in the first embodiment can be adopted.

The second collision possibility calculation unit 42 calculates the possibility of collision between the speed uncertain vehicle Ns and the autonomous driving vehicle 2 in the situation illustrated in FIG. 7. For the calculation of the possibility of collision, a method similar to that in the case of the virtual object in the first embodiment can also be adopted.

For example, if the remote instruction location situation is a situation of turning right at the intersection, when another vehicle (including the speed uncertain vehicle) is not present on the lane intersecting the target route of the autonomous driving vehicle 2, the remote instruction request determination unit 43 determines that the remote instruction request unnecessity condition is satisfied assuming that the right turn can be performed by the autonomous driving without requesting the remote commander R for the remote instruction.

If another vehicle (for example, another vehicle included in the detection range of the radar sensor of autonomous driving vehicle 2) of which the speed is detected is not present on the lane intersecting the target route of autonomous driving vehicle 2, but if a speed uncertain vehicle is present, when the possibility of collision between the speed uncertain vehicle and the autonomous driving vehicle 2 calculated by the second collision possibility calculation unit 42 is lower than a third threshold value, the remote instruction request determination unit 43 determines that the remote instruction request unnecessity condition is satisfied assuming that the right turn can be performed by the autonomous driving without requesting the remote commander R for the remote instruction. The third threshold value is a threshold value having a value set in advance.

If another vehicle of which the speed is detected is present on the lane intersecting the target route of autonomous driving vehicle 2, but if a speed uncertain vehicle is present, when the possibility of collision between the speed uncertain vehicle and the autonomous driving vehicle 2 calculated by the second collision possibility calculation unit 42 is lower than a fourth threshold value, even if a remote instruction is requested to the remote commander R, since it is highly probable that the autonomous driving vehicle 2 will wait for a possibility of any situation change, the remote instruction request determination unit 43 determines that the remote instruction request unnecessity condition is satisfied. The fourth threshold value is a threshold value having a value set in advance which is larger than that of the third threshold value.

On the other hand, for example, if the possibility of collision between the speed uncertain vehicle and the autonomous driving vehicle 2 is equal to or higher than the third threshold value and lower than the fourth threshold value, the remote instruction request determination unit 43 determines that the remote instruction request unnecessity condition is not satisfied.

The remote instruction request determination unit 43 may determine that the remote instruction request unnecessity condition is satisfied when the possibility of collision is lower than the third threshold value, and may determine that the remote instruction request unnecessity condition is not satisfied when the possibility of collision is equal to or higher than the fourth threshold value. Conversely, the remote instruction request determination unit 43 may determine that the remote instruction request unnecessity condition is not satisfied when the possibility of collision is lower than the third threshold value, and may determine that the remote instruction request unnecessity condition is satisfied when the possibility of collision is equal to or higher than the fourth threshold value.

For example, if the remote instruction location situation is a situation of turning right at the intersection, when another vehicle (including the speed uncertain vehicle) is not present on the lane intersecting the target route of autonomous driving vehicle 2, the autonomous driving control unit 44 performs the right turn at the intersection along the target route by the autonomous driving, as the positive autonomous determination.

If another vehicle of which speed is detected is not present on the lane intersecting the target route of autonomous driving vehicle 2, but if a speed uncertain vehicle is present, when the possibility of collision between the speed uncertain vehicle and the autonomous driving vehicle 2 calculated by the second collision possibility calculation unit 42 is lower than the third threshold value, the autonomous driving control unit 44 may perform the right turn at the intersection along the target route by the autonomous driving, as the positive autonomous determination.

If another vehicle of which speed is detected is not present on the lane intersecting the target route of autonomous driving vehicle 2, but if a speed uncertain vehicle is present, when the possibility of collision between the speed uncertain vehicle and the autonomous driving vehicle 2 calculated by the second collision possibility calculation unit 42 is equal to or higher than the fourth threshold value, the autonomous driving control unit 44 may wait at a right turn waiting position in the intersection, as the passive autonomous determination.

Processing by Autonomous Driving System in Second Embodiment

Next, processing by the autonomous driving system 200 according to the second embodiment will be described with reference to the drawings. FIG. 8 is a flowchart illustrating a specific example of the remote instruction request determination processing when the remote instruction location situation is a situation of turning right at the intersection in the second embodiment.

As illustrated in FIG. 8, in S50, the autonomous driving ECU 40 of the autonomous driving system 200 determines whether or not the autonomous driving vehicle 2 approaches the occurrence position of the remote instruction location situation using the remote instruction request determination unit 37. If it is determined that the autonomous driving vehicle 2 approaches the occurrence position of the remote instruction location situation (YES in S50), the autonomous driving ECU 40 makes the process proceed to S52. If it is not determined that the autonomous driving vehicle 2 approaches the occurrence position of the remote instruction location situation (NO in S50), the autonomous driving ECU 40 ends the current processing.

In S52, the autonomous driving ECU 40 determines whether or not the speed uncertain vehicle is present on the lane intersecting the target route of the autonomous driving vehicle 2 using the speed uncertain vehicle determination unit 41. The speed uncertain vehicle determination unit 41 performs the above-described determination based on the target route of the autonomous driving vehicle 2 and the external environment of the autonomous driving vehicle 2. If it is determined that the speed uncertain vehicle is present (YES in S52), the autonomous driving ECU 40 makes the process proceed to S54. If it is not determined that the speed uncertain vehicle is present (NO in S52), the autonomous driving ECU 40 makes the process proceed to S58.

In S54, the autonomous driving ECU 40 calculates the possibility of collision between the speed uncertain vehicle and the autonomous driving vehicle 2 using the second collision possibility calculation unit 42. The second collision possibility calculation unit 42 calculates the possibility of collision between the speed uncertain vehicle and the autonomous driving vehicle 2 under an assumption that the speed uncertain vehicle is approaching at a speed set in advance when the autonomous driving vehicle 2 continues to travel on the target route by the autonomous driving. Thereafter, the autonomous driving ECU 40 makes the process proceed to S56.

In S56, the autonomous driving ECU 40 determines whether or not the possibility of collision between the speed uncertain vehicle and the autonomous driving vehicle 2 is equal to or higher than the third threshold value using the remote instruction request determination unit 43. If it is determined that the possibility of collision between the speed uncertain vehicle and the autonomous driving vehicle 2 is equal to or higher than the third threshold value (YES in S56), the autonomous driving ECU 40 makes the process proceed to S60. If it is not determined that the possibility of collision between the speed uncertain vehicle and the autonomous driving vehicle 2 is equal to or higher than the third threshold value (NO in S56), the autonomous driving ECU 40 makes the process proceed to S58.

In S58, the autonomous driving ECU 40 performs the right turn at the intersection along the target route using the autonomous driving control unit 39. The autonomous driving control unit 44 performs the right turn of the autonomous driving vehicle 2 at the intersection by transmitting a control signal to the actuator 26. Thereafter, the autonomous driving ECU 40 ends the current processing.

In S60, the autonomous driving ECU 40 determines whether or not the possibility of collision between the speed uncertain vehicle and the autonomous driving vehicle 2 is lower than the fourth threshold value using the remote instruction request determination unit 43. The fourth threshold value is a threshold value having a value larger than that of the third threshold value. If it is determined that the possibility of collision between the speed uncertain vehicle and the autonomous driving vehicle 2 is lower than the fourth threshold value (YES in S60), the autonomous driving ECU 40 makes the process proceed to S62. If it is not determined that the possibility of collision between the speed uncertain vehicle and the autonomous driving vehicle 2 is lower than the fourth threshold value (NO in S60), the autonomous driving ECU 40 makes the process proceed to S64.

In S62, the autonomous driving ECU 40 requests the remote commander R (remote instruction apparatus 1) for the remote instruction using the remote instruction request determination unit 43. Thereafter, the autonomous driving ECU 40 ends the current processing.

In S64, the autonomous driving ECU 40 waits at the right turn waiting position of the autonomous driving vehicle 2 using the autonomous driving control unit 44. The autonomous driving control unit 44 causes the autonomous driving vehicle 2 to wait at the right turn waiting position by transmitting a control signal to the actuator 26. Thereafter, the autonomous driving ECU 40 ends the current processing.

Operational Effects of Autonomous Driving System in Second Embodiment

According to the autonomous driving system 200 in the second embodiment described above, if the speed uncertain vehicle is present on the lane intersecting the target route of autonomous driving vehicle 2 in the remote instruction location situation, the possibility of collision between the speed uncertain vehicle assumed to approach at a speed set in advance and the autonomous driving vehicle 2 is calculated, and when the possibility of collision is lower than the third threshold value or equal to or higher than the fourth threshold value which is larger than the third threshold value, it is determined that the remote instruction is not requested. Therefore, according to the autonomous driving system 200, since the remote instruction is not requested to the remote commander R when there is little need to be confused in the determination of the autonomous driving vehicle 2 even if the speed uncertain vehicle is taken into consideration, it is possible to suppress the decrease of the travel efficiency of the autonomous driving vehicle 2 caused by the frequent remote instruction requests.

In addition, according to the autonomous driving system 200, the autonomous driving vehicle 2 continues to travel along the target route by the autonomous driving if it is determined that the remote instruction is not requested because the possibility of collision between speed uncertain vehicle and the autonomous driving vehicle 2 is low, or the autonomous driving vehicle 2 is stopped if it is determined that the remote instruction is not requested because the possibility of collision between the speed uncertain vehicle and the autonomous driving vehicle 2 is high. Therefore, it is possible to suppress the decrease in the travel efficiency of the autonomous driving vehicle 2.

The embodiments of the present disclosure have been described above, but the present disclosure is not limited to the above-described embodiments. The present disclosure can be implemented in various forms including various modifications and improvements based on the knowledge of those skilled in the art, including the above-described embodiments.

For example, the autonomous driving system 100 according to the first embodiment does not necessarily need to include the blind area determination unit 35 and the first collision possibility calculation unit 36. The autonomous driving system 100 only needs to be able to determine whether or not the remote instruction request is necessary using the remote instruction request determination unit 37.

In addition, the first embodiment and the second embodiment may be combined. The autonomous driving system 100 in the first embodiment may further include a speed uncertain vehicle determination unit 41 and a second collision possibility calculation unit 42, and may have functions of the remote instruction request determination unit 43 and the autonomous driving control unit 44. In calculating the possibility of collision between the virtual object and the autonomous driving vehicle 2, the remote instruction request determination unit 37 does not need to determine using both the first threshold value and the second threshold value, and may determine using only one of them. Similarly, in calculating the possibility of collision between the speed uncertain vehicle and the autonomous driving vehicle 2, the remote instruction request determination unit 43 does not need to determine using both the third threshold value and the fourth threshold value, and may determine using only one of them.

The autonomous driving control units 39 and 44 do not necessarily need to perform the autonomous driving control using the determination by the remote instruction request determination units 37 and 43. The autonomous driving control units 39 and 44 may perform the positive autonomous determination and the passive autonomous determination according to the determination conditions different from the determinations in the remote instruction request determination units 37 and 43. The autonomous driving control units 39 and 44 may be configured to perform only one of the positive autonomous determination and the passive autonomous determination. The autonomous driving systems 100 and 200 are not limited by the content of processing by the autonomous driving control units 39 and 44.

Not limited to the case where the remote instruction location situation is a situation of turning right at the intersection, if the remote instruction location situation is a situation of turning left from the T-shape road to the priority road, when another vehicle is not present on the lane intersecting the target route of autonomous driving vehicle 2 (on the lane of the approaching destination), and it is determined by the blind area determination unit 35 that the sensor blind area is not present, the autonomous driving control unit 39 may perform the left turn at the T-shape road by the autonomous driving along the target route, as the positive autonomous determination. In addition, when another vehicle is not present on the lane intersecting the target route of autonomous driving vehicle 2 and it is determined by the blind area determination unit 35 that the sensor blind area is not present, but when the possibility of collision between the virtual object and the autonomous driving vehicle 2 calculated by the first collision possibility calculation unit 36 is lower than the first threshold value, the autonomous driving control unit 39 may perform the left turn at the T-shape road by the autonomous driving along the target route, as the positive autonomous determination.

If the remote instruction location situation is a situation of turning left from the T-shape road to the priority road, when another vehicle is not present on the lane intersecting the target route and it is determined by the blind area determination unit 35 that the sensor blind area is present, and when the possibility of collision between the virtual object and autonomous driving vehicle 2 is equal to or higher than the second threshold value which is larger than the first threshold value, the autonomous driving control unit 39 may stop the autonomous driving vehicle 2 at the position for peeking to the priority road, as the passive autonomous determination.

Similarly, if the remote instruction location situation is a situation of passing through the intersection without the traffic signal, when another vehicle is not present on the lane intersecting the target route of autonomous driving vehicle 2 (on the lane that intersects at the intersection) and it is determined by the blind area determination unit 35 that the sensor blind area does is not present, the autonomous driving control unit 39 may pass through the intersection by the autonomous driving along the target route, as the positive autonomous determination. In addition, if another vehicle is not present on the lane intersecting the target route of autonomous driving vehicle 2 and it is determined by the blind area determination unit 35 that the sensor blind area is present, but when the possibility of collision between the virtual object and the autonomous driving vehicle 2 calculated by the first collision possibility calculation unit 36 is lower than the first threshold value, the autonomous driving control unit 39 may pass through the intersection by the autonomous driving along the target route, as the positive autonomous determination.

If the remote instruction location situation is a situation of passing through the intersection without the traffic signal, when another vehicle is not present on the lane intersecting the target route, and it is determined by the blind area determination unit 35 that the sensor blind area is present and the possibility of collision between the virtual object and the autonomous driving vehicle 2 is equal to or higher than the second threshold value which is larger than the first threshold value, the autonomous driving control unit 39 may cause the autonomous driving vehicle 2 to wait at the stop line before the intersection, as the passive autonomous determination.

If the remote instruction location situation is a situation of turning left from the T-shape road to the priority road, when another vehicle of which the speed is detected is not present on the lane intersecting the target route of autonomous driving vehicle 2 but the speed uncertain vehicle is present, and when the possibility of collision between the speed uncertain vehicle and the autonomous driving vehicle 2 calculated by the second collision possibility calculation unit 42 is lower than the third threshold value, the autonomous driving control unit 44 in the second embodiment may perform the left turn at a T-shape road by the autonomous driving along the target route, as the positive autonomous determination.

If another vehicle of which the speed is detected is not present on the lane intersecting the target route of autonomous driving vehicle 2 but the speed uncertain vehicle is present, when the possibility of collision between the speed uncertain vehicle and the autonomous driving vehicle 2 calculated by the second collision possibility calculation unit 42 is equal to or higher than the fourth threshold value, the autonomous driving control unit 44 may stop the autonomous driving vehicle 2 at the position for peeking to the priority road, as the passive autonomous determination.

Similarly, if the remote instruction location situation is a situation of passing through the intersection without the traffic signal, when another vehicle of which the speed is detected is not present on the lane intersecting the target route of autonomous driving vehicle 2 but the speed uncertain vehicle is present, and when the possibility of collision between the speed uncertain vehicle and the autonomous driving vehicle 2 calculated by the second collision possibility calculation unit 42 is lower than the third threshold value, the autonomous driving control unit 44 may pass through the intersection by the autonomous driving along the target route, as the positive autonomous determination.

When another vehicle of which the speed is detected is not present on the lane intersecting the target route of autonomous driving vehicle 2 but the speed uncertain vehicle is present, and when the possibility of collision between the speed uncertain vehicle and the autonomous driving vehicle 2 calculated by the second collision possibility calculation unit 42 is equal to or higher than the fourth threshold value, the autonomous driving control unit 44 may cause the autonomous driving vehicle 2 to wait at the stop line before the intersection, as the passive autonomous determination.

What is claimed is:

1. An autonomous driving system that performs a traveling of an autonomous driving vehicle based on a remote instruction by a remote commander, comprising an electronic control unit programmed to:
  acquire a position of the autonomous driving vehicle on a map;
  recognize an external environment of the autonomous driving vehicle based on a result of detection performed by a vehicle-mounted sensor of the autonomous driving vehicle;
  recognize a remote instruction location situation on a target route of the autonomous driving vehicle set in advance based on the target route, the position of the autonomous driving vehicle on the map, and map information;
  while the autonomous vehicle approaches a position of the remote instruction location situation,
  determine whether or not the autonomous driving vehicle approaches the occurrence position of the remote instruction location situation;
  determine whether the remote instruction request unnecessity condition is satisfied or not when the autonomous driving vehicle approaches the occurrence position of the remote instruction location situation;
  determine whether or not a sensor blind area is present on a lane intersecting the target route of the autonomous driving vehicle in the remote instruction location situation, based on the target route of the autonomous driving vehicle and the external environment of the autonomous driving vehicle;
  calculate a possibility of collision between a virtual object having a speed set in advance and the autonomous driving vehicle under an assumption that the virtual object jumps out from the sensor blind area when the autonomous driving vehicle continues to travel on the target route by the autonomous driving, if it is determined that the sensor blind area is present,
  determine that the remote instruction request unnecessity condition is satisfied and continue autonomous driving without requesting remote instructions from the remote commander if it is determined that another vehicle is not present on the lane intersecting the target route and it is determined that the sensor blind area is present, but when the calculated possibility of collision between the virtual object and the autonomous driving vehicle is lower than a first threshold value;
  request remote instruction from the remote commander if the calculated possibility of collision is equal to or higher than the first threshold and lower than a second threshold, the second threshold being higher than the first threshold;

determine that the remote instruction request unnecessity condition is satisfied and wait before continuing without requesting remote instructions from the remote commander if it is determined that another vehicle is not present on the lane intersecting the target route and it is determined that the sensor blind area is present, but when the calculated possibility of collision between the virtual object and the autonomous driving vehicle is equal to or higher than the second threshold;

determine whether or not a speed uncertain vehicle is present, which is another vehicle having an uncertain speed on a lane intersecting the target route of the autonomous driving vehicle in the remote instruction location situation, based on the target route of the autonomous driving vehicle and the external environment of the autonomous driving vehicle; and calculate a possibility of collision between the speed uncertain vehicle and the autonomous driving vehicle under an assumption that the speed uncertain vehicle is approaching at a speed set in advance when the autonomous vehicle continues to travel on the target route by the autonomous driving, if it is determined that the speed uncertain vehicle is present;

wherein the electronic control unit is programmed to determine that the remote instructions is not requested, if the possibility of collision is lower than a third threshold or if the possibility of collision is equal to or higher than a fourth threshold which is larger than the third threshold value.

2. The autonomous driving system according to claim 1, wherein the electronic control unit is programmed to:

cause the autonomous driving vehicle to continue to travel along the target route if the possibility of collision between the speed uncertain vehicle and the autonomous driving vehicle is lower than the third threshold value and if it is determined that the remote instruction is not requested, or to cause the autonomous driving vehicle to stop if the possibility of collision between the speed uncertain vehicle and the autonomous driving vehicle is equal to or higher than the fourth threshold value and it is determined that the remote instruction is not requested.

3. The autonomous driving system according to claim 1, wherein a speed of the virtual object is a legal maximum speed corresponding to the land or a reference speed.

4. The autonomous driving system according to claim 1, wherein the remote instruction location situation is a situation of turning from the T-shape road without traffic signal to the priority road; and wherein the electronic control unit is further programmed to:

determine that the remote instruction request unnecessity condition is satisfied and wait before continuing without requesting remote instructions from the remote commander if another vehicle is present at an approaching destination of the autonomous driving vehicle, and determine that the remote instruction request unnecessity condition is satisfied and wait before continuing without requesting remote instructions from the remote commander if another vehicle is not present at the approaching destination of the autonomous driving vehicle and another vehicle positioned at the opposite side of the approaching destination on the lane of the approaching destination is stopped.

* * * * *